(12) United States Patent
Fedurco et al.

(10) Patent No.: US 8,889,817 B2
(45) Date of Patent: Nov. 18, 2014

(54) TRIAZINE POLYMER THAT CAN BE USED AS MEMBRANE IN A FUEL CELL

(75) Inventors: Milan Fedurco, Clermont-Ferrand Cedex (FR); Antonio Delfino, Clermont-Ferrand Cedex (FR)

(73) Assignees: Compagnie Generale des Etablissements Michelin, Clermont-Ferrand (FR); Michelin Recherche et Technique S.A., Granges Paccot (CH)

( * ) Notice: Subject to any disclaimer, the term of this patent is extended or adjusted under 35 U.S.C. 154(b) by 0 days.

(21) Appl. No.: 13/812,885

(22) PCT Filed: Jul. 6, 2011

(86) PCT No.: PCT/EP2011/061423
§ 371 (c)(1),
(2), (4) Date: Mar. 25, 2013

(87) PCT Pub. No.: WO2012/016777
PCT Pub. Date: Feb. 9, 2012

(65) Prior Publication Data
US 2013/0217851 A1    Aug. 22, 2013

(30) Foreign Application Priority Data

Aug. 4, 2010  (FR) .................................... 10 56437

(51) Int. Cl.
| | | |
|---|---|---|
| *C08G 75/00* | (2006.01) | |
| *C08G 75/20* | (2006.01) | |
| *C08G 75/12* | (2006.01) | |
| *C08G 75/23* | (2006.01) | |
| *C08J 5/22* | (2006.01) | |
| *C08G 65/40* | (2006.01) | |
| *H01M 8/10* | (2006.01) | |
| *C08L 81/06* | (2006.01) | |
| *C08G 73/06* | (2006.01) | |
| *C08G 75/02* | (2006.01) | |
| *C08L 81/02* | (2006.01) | |

(52) U.S. Cl.
CPC ....... *C08G 65/40* (2013.01); *H01M 2300/0082* (2013.01); *C08G 75/20* (2013.01); *C08G 75/12* (2013.01); *C08G 75/23* (2013.01); *C08J 5/2262* (2013.01); *H01M 8/106* (2013.01); *H01M 8/103* (2013.01); *C08L 81/06* (2013.01); *C08G 73/0644* (2013.01); *Y02E 60/521* (2013.01); *C08G 75/0204* (2013.01); *C08J 2381/06* (2013.01); *C08L 81/02* (2013.01)
USPC ............. 528/172; 528/125; 528/86; 528/168; 528/211

(58) Field of Classification Search
USPC ............................ 528/172, 125, 86, 168, 211
See application file for complete search history.

(56) References Cited

U.S. PATENT DOCUMENTS

| | | | |
|---|---|---|---|
| 6,495,209 B1 | 12/2002 | Cisar | 427/384 |
| 7,037,614 B1 | 5/2006 | Cooray et al. | 429/33 |
| 7,901,821 B2 | 3/2011 | Buchi et al. | 429/429 |
| 2004/0236062 A1 | 11/2004 | Hofmann | 528/125 |
| 2005/0221135 A1 | 10/2005 | Cooray et al. | 429/20 |
| 2008/0160363 A1 | 7/2008 | Tsukada | 429/19 |
| 2010/0040930 A1 | 2/2010 | Delfino et al. | 429/34 |
| 2010/0173227 A1 | 7/2010 | Olsommer | 429/514 |
| 2011/0311899 A1 | 12/2011 | Onodera et al. | 429/482 |

FOREIGN PATENT DOCUMENTS

| | | |
|---|---|---|
| JP | 2001-277720 A | 10/2001 |
| WO | WO 2005/006472 A1 | 1/2005 |
| WO | WO 2006/012953 A2 | 2/2006 |
| WO | WO 2006/012954 A1 | 2/2006 |
| WO | WO 2006/100029 A1 | 9/2006 |
| WO | WO 2008/125174 A1 | 10/2008 |

OTHER PUBLICATIONS

D.M. Tigelaar et al., "Synthesis and Properties of Novel Proton-Conducting Aromatic Poly(ether sulfone)s That Contain Triazine Groups," Macromolecules, vol. 42, pp. 1888-1896 (2009).
R. Souzy et al., "Functional fluoropolymers for fuel cell membranes," Progress in Polymer Science, vol. 30 (2005), pp. 644-687.
R.D. Spencer et al., "Determination of Four Closely Related Triaryl-s-Triazines by Infrared Spectrometry," Analytical Chemistry, vol. 35, No. 11 (Oct. 1963), pp. 1633-1636.
A.E. Feiring et al., "Fluorinated Poly(ether Sulfone)s," Journal of Polymer Science: Part A: Polymer Chemistry, vol. 28 (1990), pp. 2809-2819.
X. Zhu et al., "Challenging reinforced composite polymer electrolyte membranes based on disulfonated poly(arylene ether sulfone)-impregnated expanded PTFE for fuel cell applications," Journal of Material Chemistry, vol. 17 (2007), pp. 386-397.

*Primary Examiner* — Shane Fang
(74) *Attorney, Agent, or Firm* — Fitzpatrick, Cella, Harper & Scinto

(57) ABSTRACT

Triazine polymer comprising at least a plurality of base structural units comprising at least a moiety corresponding to the formula:

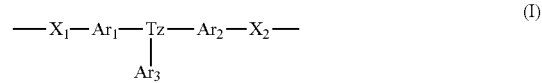

in which:
the symbols $X_1$ and $X_2$, which are identical or different, represent S, SO, or $SO_2$;
the symbols $Ar_1$ and $Ar_2$, which are identical or different, represent a substituted or unsubstituted phenylene group;
the symbol $Ar_3$ represents a substituted or unsubstituted phenyl group;
the symbol Tz represents the 1,3,5-triazine nucleus.
This polymer of the invention, which can be used as electrolyte in a PEM fuel cell, makes it possible to obtain membranes of high chemical and dimensional stability which additionally exhibit a high ion conductivity.

22 Claims, 28 Drawing Sheets

(I-1)

(I-2)

(I-3)

(I-A-1)

(I-A-2)

(I-A-3)

(I-B-1)

(I-B-2)

(I-B-3)

(I-B-4)

(I-B-5)

(I-B-6)

(II-A-1)

(II-A-2)

(II-A-3)

(II-B-1)

(II-B-2)

(II-B-3)

(III-1)

(III-2)

(III-3)

(IV-1)

(IV-2)

(IV-3)

Polymer 5

Fig. 18
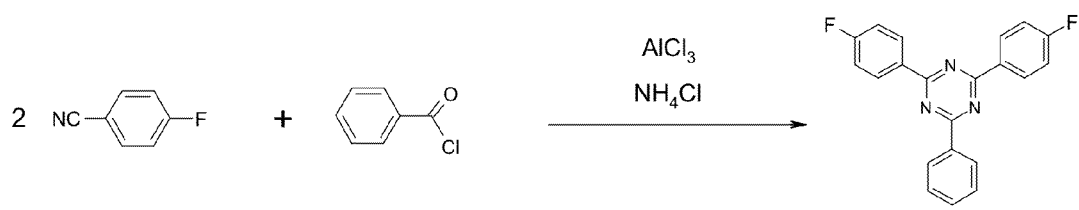
Compound 1
*Fig. 18A*
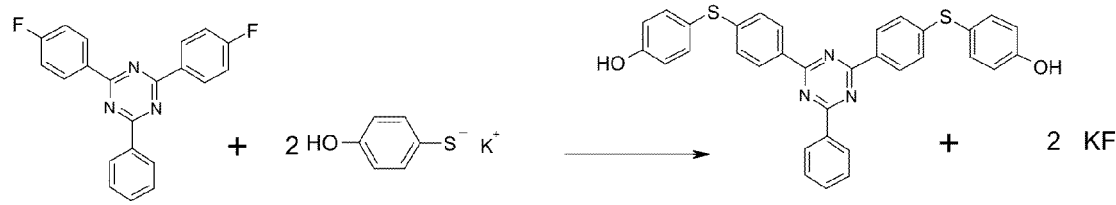
Compound 1                           Compound 2
*Fig. 18B*
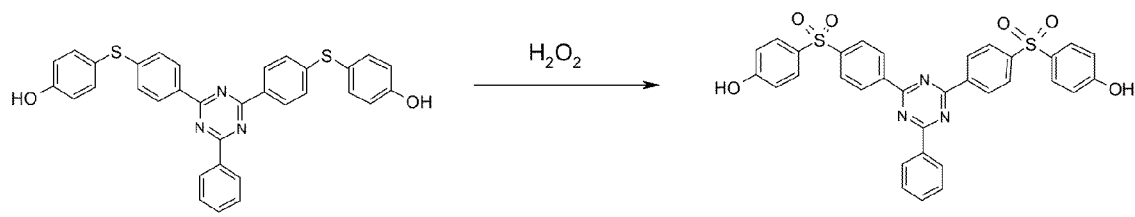
Compound 2                           Compound 3
*Fig. 18C*

Fig. 20
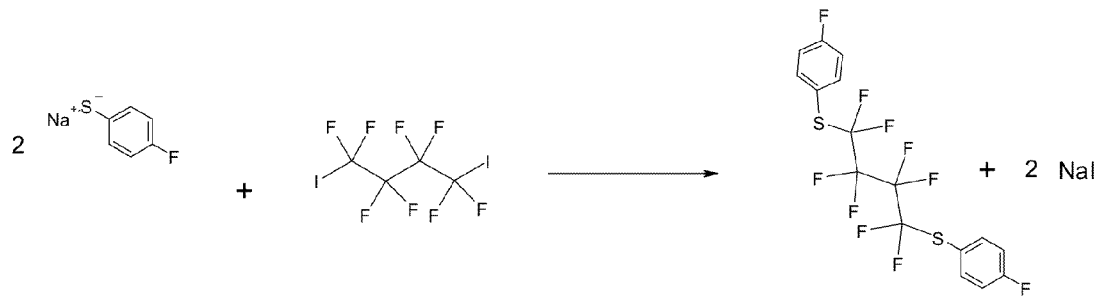
Compound 4
Fig. 20A
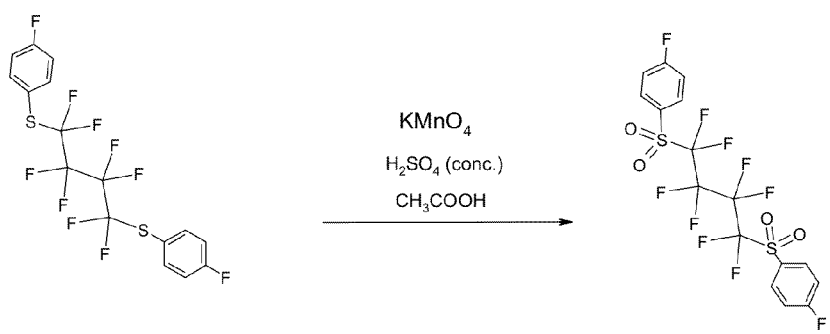
Compound 4    Compound 5
Fig. 20B
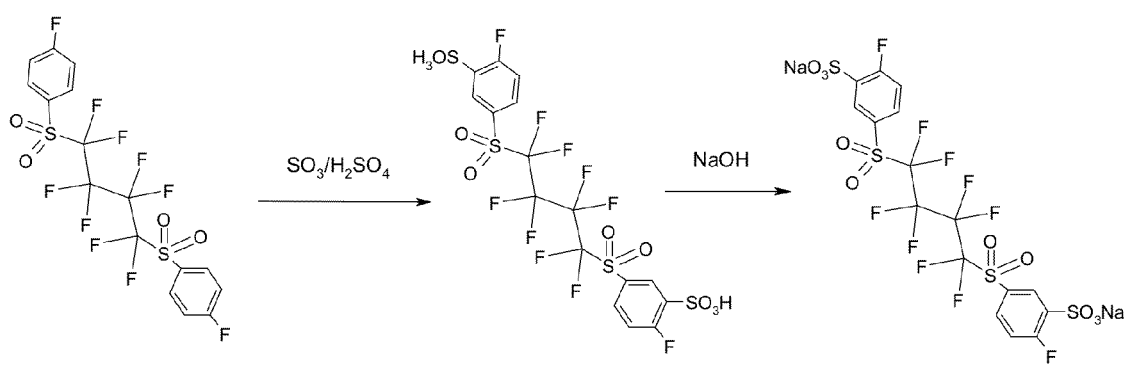
Compound 5    Compound 6
Fig. 20C

Fig. 22
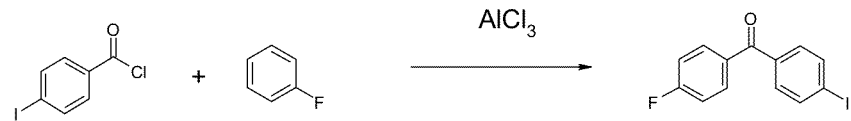
Compound 7
*Fig. 22A*
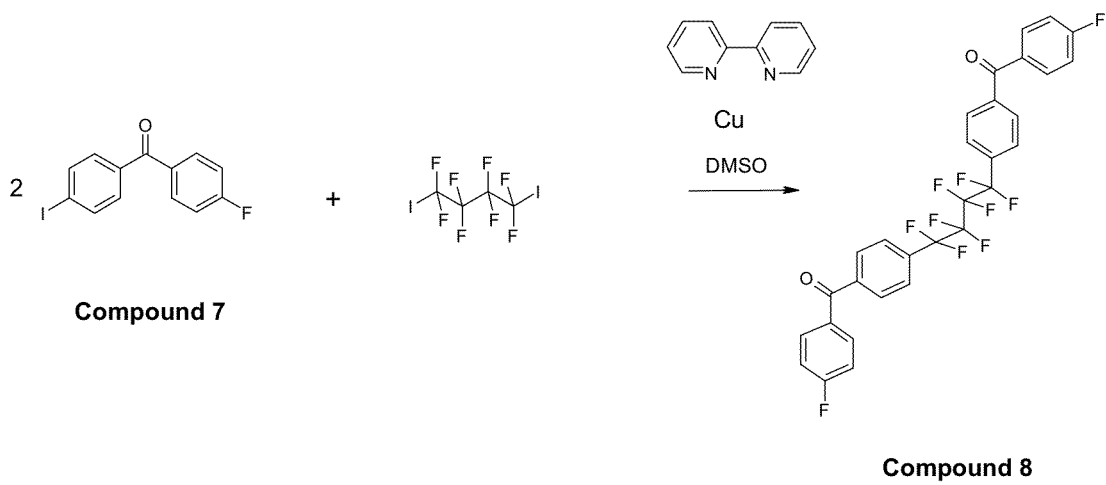
*Fig. 22B*
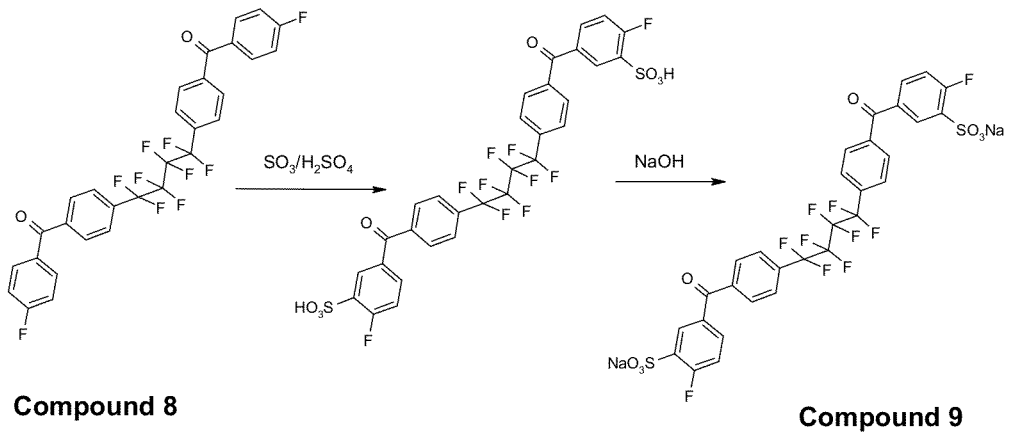
*Fig. 22C*

Polymer 7

Fig. 26
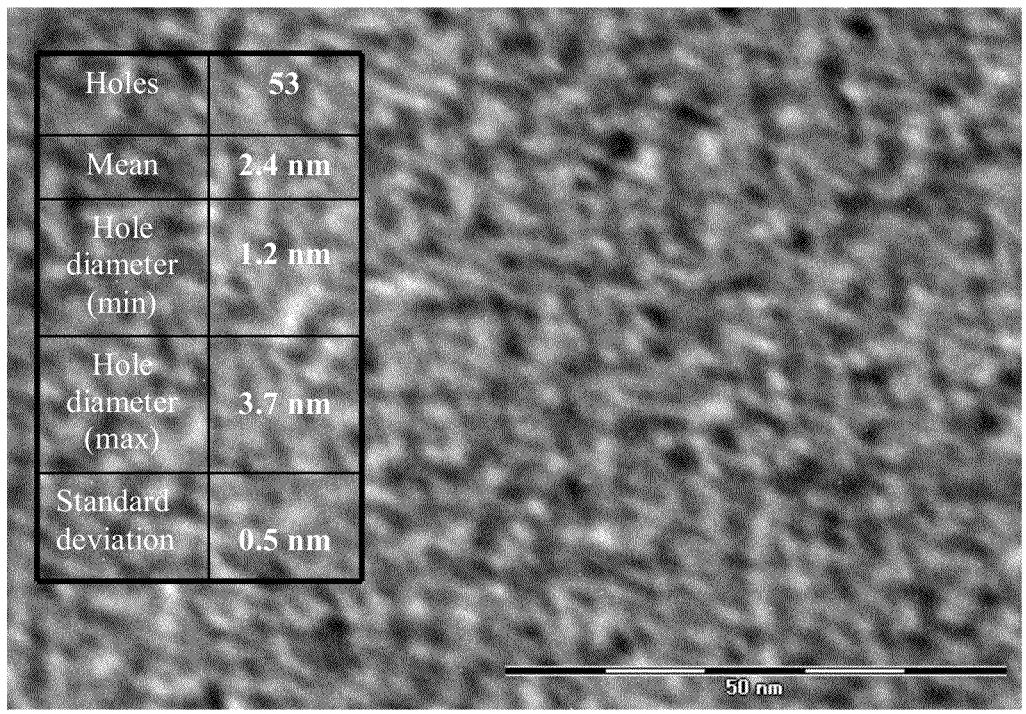
Fig. 26A
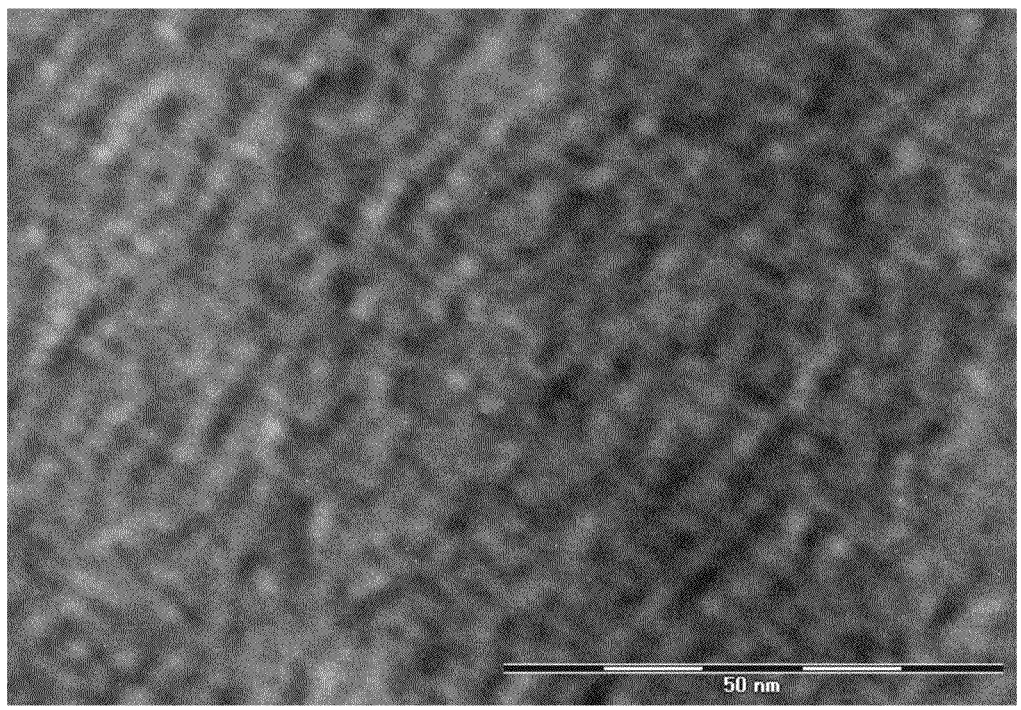
Fig. 26B

TRIAZINE POLYMER THAT CAN BE USED AS MEMBRANE IN A FUEL CELL

I. FIELD OF THE INVENTION

The present invention relates to the polymers which can be used, in the sulphonated form, as solid electrolyte or membrane in a fuel cell.

It relates more particularly to the above polymers of the aromatic type comprising base structural units with a triazine nucleus.

II. STATE OF THE ART

The recent interest in fuel cells arises from their ability to convert chemical energy into electricity with a relatively high yield and a low emission of environmental pollutants. The use of such electrochemical devices extends today from the motor vehicle industry to portable computers, to mobile phones, to the stationary generation of electrical energy and to other applications comprising exploration of the sea and space.

It should be remembered first of all that a fuel cell is an electrochemical energy generator in which a chemical reaction between hydrogen and oxygen is maintained under control, which reaction will produce water (reverse reaction to electrolysis). It produces electrical energy and heat. The electrolyte therein is typically composed of a PEM (Polymer Electrolyte Membrane) which conducts protons and which is capable of separating the reactive entities, consisting of two very distinct nanophases: on the one hand, a hydrophobic part which provides mechanical integrity, watertightness and gastightness (the gases being $H_2$ and $O_2$) and, on the other hand, a sulphonated part consisting of narrow hydrophilic channels allowing the protons to pass and thus providing the ionic conductivity of the cell. This polymer membrane is positioned between the anode and the cathode of the cell, such an assembly being commonly referred to as "MEA" (Membrane Electrode Assembly).

Such fuel cells, MEA assemblies and their general operating principles are well known. They have been described in a very large number of documents; mention may be made, as examples, of the general article entitled "*Functional fluoropolymers for fuel cell membranes*" by Renaud Souzy & Bruno Ameduri, Prog. Polymer Sci., 30 (2005), 644-687, and Patent Applications WO 2005/006472, WO 2006/012953, WO 2006/012954, WO 2006/100029 and WO 2008/125174.

A polymeric material which is a good candidate for a PEM fuel cell must meet very high requirements as regards its mechanical, physical and chemical properties. Ideally, the MEA assembly is expected to be able to operate for thousands of hours at relatively high temperatures (60 to 100° C. in the case of PEM cells, up to 160° C. in the case of methanol cells referred to as DMFCs) while being exposed to particularly high humidity and acidic pH values close to zero. The majority of known polymers undergo decomposition under such conditions, whether of aliphatic type or of aromatic type.

Aliphatic copolymers derived from perfluorosulphonic acid, sold, for example, under the Nafion® or Flemion® name, have been intensively employed as conducting membranes in fuel cells of the hydrogen/air, hydrogen/oxygen or methanol/air type.

Despite a very good ion conductivity and a high chemical stability, the use of polymers of the Nafion® type is first of all not suited to employment in fuel cells of the methanol type, due to reduced performance for the highest operating temperatures, due to a significant increase in permeability of the membrane with regard to the methanol.

Another known disadvantage of the polymers of the Nafion® type, in operation in the cell, is their relatively limited chemical stability. This is because perfluoropolymers are known to absorb large amounts of water responsible for repeated dimensional changes and swellings of the membrane: repeated cycles of drying and humidification, during successive shutdowns and startups of the fuel cell, result in an increased permeability to gases ($H_2$ and $O_2$); this increased permeability is responsible for the formation of hydrogen peroxide and free radicals (OH), so many mechanisms which can result in rapid degradation in a membrane and in the premature end of life of the fuel cell. In order to limit these dimensional changes and to thus improve the endurance of the membranes, it has been proposed in particular to add, as reinforcing polymer, a second fluoropolymer, in particular a PTFE (polytetrafluoroethylene) of the expanded microporous (or "ePTFE") type, and to thus form tougher composite membranes (see, for example, U.S. Pat. No. 6,495,209).

Finally, another major disadvantage of the polymers of the Nafion® type is the cost of their synthesis, without mentioning a base chemistry which no longer corresponds today to the most recent requirements in terms of the environment and of health and safety regulations.

Consequently, much research has been carried out in the past in an attempt to reduce the cost of the PEM membranes.

It has in particular been proposed to replace the above aliphatic polymers with aromatic polymers, which are lower in cost and which furthermore have the advantage of exhibiting a reduced permeability to the gases ($H_2$ and $O_2$).

Examples of such polymers are, for example, poly (arylene-ether-sulphone)s, sold in particular under the "Udel" or "Radel" names, or poly(ether-ether-ketone)s, sold, for example, under the "PEEK" name. The above aromatic polymers, once sulphonated, still do not make it possible today to achieve the compromise in performance and in cost offered with the fluorinated aliphatic polymers of the Nafion® type. In addition, these aromatic polymers generally mix poorly with an ePTFE-type polymer and the membranes which result therefrom thus cannot be easily reinforced with an ePTFE polymer, such a reinforcing requiring a preliminary surface treatment of the ePTFE polymer by plasma or by the chemical route in very aggressive chemical media (see, for example, the paper entitled "*Challenging reinforced composite polymer electrolyte membranes based on disulfonated poly(arylene-ether-sulfone)-impregnated expanded PTFE for fuel cell applications*", Xiaobing Zhu et al., J. Mat. Chem., 2007, 386-397).

Other examples of polymers of the aromatic type have been described more recently in the patent documents US2005/0221135 and U.S. Pat. No. 7,037,614. They are sulphonated triazine polymers, the monomers of which are connected via ether (—O—) bridges. The syntheses described in these documents are complex, expensive and difficult to reproduce. In addition, it has been found that their chemical and dimensional stability is insufficient even after a final crosslinking treatment of the membranes, which treatment furthermore requires another complex and expensive chemistry.

III. BRIEF DESCRIPTION OF THE INVENTION

During their research studies, the Applicant Companies have found a novel aromatic polymer, more specifically a polymer comprising a specific triazine nucleus, which makes it possible to overcome, at least in part, the abovementioned disadvantages.

In comparison with the triazine polymers of the prior art described above, this polymer of the invention has a markedly improved chemical stability and a markedly improved resistance to oxidation. It makes it possible to manufacture PEM membranes which, unexpectedly, in comparison with commercial membranes of the Nafion® type developed a long time ago, exhibit a chemical and dimensional stability and an ion conductivity which are at least equivalent, if not superior.

The polymer of the invention results from inexpensive monomers and it is capable of being prepared according to simple and economical synthesis processes. Finally, it can, which is not the least of its advantages, be rendered compatible with a microporous ePTFE polymer for optimal reinforcing of the membrane, without requiring the surface treatments which were mentioned above.

The triazine polymer of the invention, notably usable when it is in the sulphonated form as electrolyte in a PEM fuel cell, is characterized in that it comprises base structural units comprising at least one moiety corresponding to the formula (I) below:

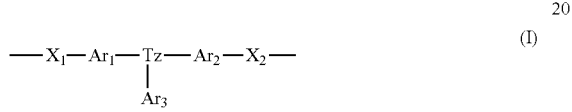

(I)

in which:
the symbols $X_1$ and $X_2$, which are identical or different, represent S, SO or $SO_2$;
the symbols $Ar_2$ and $Ar_2$, which are identical or different, represent a substituted or unsubstituted phenylene group;
the symbol $Ar_3$ represents a substituted or unsubstituted phenyl group;
the symbol Tz represents the 1,3,5-triazine nucleus.

Another subject-matter of the invention is the use of a triazine polymer according to the invention, in the sulphonated form, as membrane (solid electrolyte) in a fuel cell.

Another subject-matter of the invention is a fuel cell membrane comprising a triazine polymer according to the invention and also a membrane of composite type which comprises a triazine polymer according to the invention and which is reinforced with a layer of ePTFE (expanded microporous polytetrafluoroethylene).

Another subject-matter of the invention is a fuel cell, the membrane of which is in accordance with the invention.

The invention and its advantages will be easily understood in the light of the detailed description and implementational examples which follow, and also of the figures relating to these examples, which represent or schematize:

examples of base structural units comprising moieties of general formula (I), of respective specific formulae (I-1), (I-2) and (I-3) (FIGS. 1A, 1B and 1C);

examples of base structural units comprising moieties of general formula (I), of respective specific formulae (I-A-1), (I-A-2) and (I-A-3) (FIGS. 2A, 2B and 2C);

examples of base structural units comprising moieties of general formula (I), of respective specific formulae (I-B-1), (I-B-2) and (I-B-3) (FIGS. 3A, 3B and 3C);

examples of base structural units comprising moieties of general formula (I), of respective specific formulae (I-B-4), (I-B-5) and (I-B-6) (FIGS. 4A, 4B and 4C);

examples of additional structural units of formula (II-A), of respective specific formulae (II-A-1), (II-A-2) and (II-A-3) (FIGS. 5A, 5B and 5C);

examples of additional structural units of formula (II-B), of respective specific formulae (II-B-1), (II-B-2) and (II-B-3) (FIGS. 6A, 6B and 6C);

examples of triazine polymer sequences in accordance with the invention of respective formulae (III-1), (III-2) and (III-3), comprising both base structural units comprising moieties of formula (I-1) and additional structural units of respective formulae (II-A-1), (II-A-2) and (II-A-3) (FIGS. 7A, 7B and 7C);

examples of triazine polymer sequences in accordance with the invention of respective formulae (IV-1), (IV-2) and (IV-3), comprising both base structural units comprising moieties of respective formulae (I-1), (I-2) and (I-3) and additional structural units of formula (II-B-3) (FIGS. 8A, 8B and 8C);

an example of a triazine polymer in accordance with the invention (Polymer 1) and also a possible scheme for the synthesis of this polymer by polycondensation of two monomers A1 and B1 (FIG. 9);

another example of a triazine polymer in accordance with the invention (Polymer 2) and also a possible scheme for the synthesis of this polymer by polycondensation of two monomers A2 and B2 (FIG. 10);

another example of a triazine polymer in accordance with the invention (Polymer 3) and also a possible scheme for the synthesis of this polymer by polycondensation of two monomers A3 and B3 (FIG. 11);

two other examples of triazine polymers in accordance with the invention (Polymer 4A and Polymer 4B) and also a possible scheme for the synthesis of these polymers by polycondensation of three monomers A4, B4 and C4 (FIG. 12);

another example of a triazine polymer in accordance with the invention (Polymer 5) and also a possible scheme for the synthesis of this polymer by polycondensation of two monomers A5 and B5 (FIG. 13);

two other examples of triazine polymers in accordance with the invention (Polymer 5A and Polymer 5B) and also a possible scheme for the synthesis of these polymers by polycondensation of three monomers C5, D5 and E5 (FIG. 14);

two other examples of triazine polymers in accordance with the invention (Polymer 6A and Polymer 6B) and also a possible scheme for the synthesis of these polymers by polycondensation of three monomers A6, B6 and C6 (FIG. 15);

another example of a triazine polymer in accordance with the invention (Polymer 7) and also a possible scheme for the synthesis of this polymer by polycondensation of two monomers A7 and B7 (FIG. 16);

another example of a triazine polymer in accordance with the invention (Polymer 8) and also a possible scheme for the synthesis of this polymer by polycondensation of two monomers A8 and B8 (FIG. 17);

a possible scheme for the synthesis, in three successive stages, of the monomer A1 (or Compound 3) of FIG. 9 (FIG. 18);

the $^1$H NMR spectrum (360 MHz) of the monomer A1 (Compound 3) dissolved in $d_6$-DMSO (FIG. 19);

a possible scheme for the synthesis, in three successive stages, of the monomer B1 (or Compound 6) of FIG. 9 (FIG. 20);

the $^1$H NMR spectrum (500 MHz) of the monomer B1 (Compound 6) dissolved in $d_6$-DMSO (FIG. 21);

a possible scheme for the synthesis, in three successive stages, of the monomer B8 (or Compound 9) of FIG. 17 (FIG. 22);

the $^1$H NMR spectrum (500 MHz) of the monomer B8 (Compound 9) dissolved in $d_6$-DMSO (FIG. 23);

the formula of Polymer 1 in the sulphonated and benzophenone-blocked form and also its ¹H NMR spectrum (500 MHz), dissolved in $d_6$-DMSO (FIG. 24);

the formula of Polymer 7 in the sulphonated and benzophenone-blocked form and also its ¹H NMR spectrum (500 MHz), dissolved in $d_6$-DMSO (FIG. 25);

electron microscopy photographs respectively recorded on a horizontal cross section (FIG. 26A) and a transverse cross section (FIG. 26B) of a PEM membrane in accordance with the invention (Polymer 1) (FIG. 26);

comparative polarization curves of a PEM fuel cell using a membrane in accordance with the invention (curve $C_A$) and a commercial membrane (curve $C_B$) (FIG. 27 and FIG. 28).

IV. DETAILED DESCRIPTION OF THE INVENTION

The triazine polymer of the invention, notably usable in sulphonated form as electrolyte (or membrane, which is equivalent) in a fuel cell, thus has the essential characteristic of comprising a plurality of repeating base structural units which each comprise at least one moiety corresponding to the formula (I):

$$-X_1-Ar_1-\underset{\underset{Ar_3}{|}}{Tz}-Ar_2-X_2-$$

in which:

the symbols $X_1$ and $X_2$, which are identical or different, represent S, SO or $SO_2$;

the symbols $Ar_1$ and $Ar_2$, which are identical or different, represent a substituted or unsubstituted phenylene group;

the symbol $Ar_3$ represents a substituted or unsubstituted phenyl group;

the symbol Tz represents the 1,3,5-triazine nucleus.

The term "polymer" should be understood here as meaning any homopolymer or copolymer, in particular block copolymer, comprising the base structural units of formula (I) above.

It should be remembered here that 1,3,5-triazine (also known as "s triazine") has the formula:

The triphenyl-1,3,5-triazine is thus represented in the formula (I) above by:

$$-Ar_1-\underset{\underset{Ar_3}{|}}{Tz}-Ar_2-$$

In other words, the central moiety of general formula (I) of the base structural units thus has the expanded formula (the symbol R here representing hydrogen or a replacement for the hydrogen):

In other words, in the preferred case where $X_1$ and $X_2$ are identical, the central moiety of general formula (I) of the base structural units corresponds to one of the three formulae I-1, I-2 and I-3 respectively represented in the appended FIGS. 1A, 1B and 1C.

According to a first preferred embodiment, the moiety of the base structural units of general formula (I) corresponds to the specific formula (I-A):

$$-Ar_4-X_1-Ar_1-\underset{\underset{Ar_3}{|}}{Tz}-Ar_2\quad X_2-Ar_5-$$

in which the symbols $Ar_4$ and $Ar_5$, which are identical or different, represent (like the preceding symbols $Ar_1$ and $Ar_2$) a substituted or unsubstituted phenylene group.

In other words, the central moiety of general formula (I) of the base structural units has the expanded formula:

Thus, in the preferred case where $X_1$ and $X_2$ are identical, the central moiety of general formula (I-A) of the base structural units corresponds to one of the three formulae I-A-1, I-A-2 and I-A-3 respectively represented in the appended FIGS. 2A, 2B and 2C.

According to another preferred embodiment, the central moiety of general formula (I) of the base structural units of formula (I) corresponds to the specific formula (I-B):

$$-Y_1-X_1-Ar_1-\underset{\underset{Ar_3}{|}}{Tz}-Ar_2-X_2-Y_2-$$

in which the symbols $Y_1$ and $Y_2$, which are identical or different, represent a perfluorinated hydrocarbon linkage.

In other words, the central moiety of general formula (I-B) of the base structural units has the expanded formula:

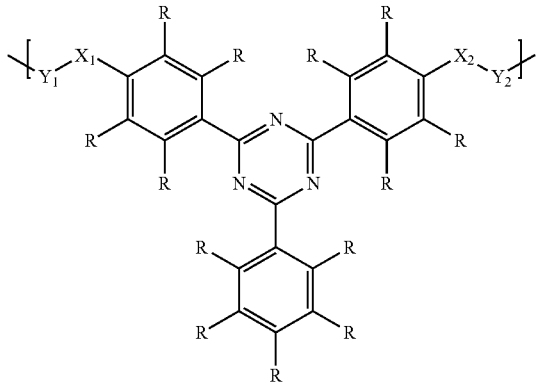

As preferred example, the perfluorinated hydrocarbon linkage above is a perfluoroalkylene of formula $(CF_2)_m$ in which m varies from 1 to 20, more preferably from 2 to 20 and in particular from 2 to 8.

In other words, in this preferred example and in the more preferred case where, on the one hand, $X_1$ and $X_2$ are identical and, on the other hand, $Y_1$ and $Y_2$ are identical, the central moiety of formula (I-B) of the base structural units corresponds to one of the three formulae I-B-1, I-B-2 and I-B-3 respectively represented in the appended FIGS. 3A, 3B and 3C.

As another preferred example, the perfluorinated hydrocarbon linkage is a perfluorocyclobutylene, to recapitulate of formula:

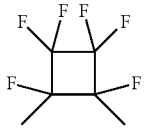

In other words, in this preferred example and in the more preferred case where, on the one hand, $X_1$ and $X_2$ are identical and, on the other hand, $Y_1$ and $Y_2$ are identical, the moiety of formula (I-B) of the base structural units corresponds to one of the three formulae I-B-4, I-B-5 and I-B-6 respectively represented in the appended FIGS. 4A, 4B and 4C.

As indicated above, the phenyl or phenylene groups $Ar_1$, $Ar_2$, $Ar_3$, $Ar_4$ and $Ar_5$ described above can be substituted or unsubstituted. When they are substituted, the invention applies in particular to the cases where just one of the phenyl or phenylene groups per base structural unit of formula (I) (or triazine nucleus) is substituted and also to the cases where several of the phenyl or phenylene groups per triazine nucleus are substituted, it being possible for just one or several identical or different substituents to be present on the same phenyl or phenylene group or on the same phenyl or phenylene groups.

Mention may in particular be made, as examples of possible substituents of the aromatic nuclei (that is to say, more precisely possible replacements of the hydrogen atoms of these phenyl or phenylene groups), of the following substituents:

—F; —Cl; —Br; —CN; —$CF_3$; —$NO_2$; —$N(CH_3)_2$; —COOH; —COOM; —$PO_3H$; —$PO_3M$; —$SO_3H$; —$SO_3M$ (the symbol M representing an alkali metal cation, preferably $Na^+$ or $K^+$);

hydroxyl, alkyl, cycloalkyl, perfluoroalkyl, sulphoalkyl, sulphoaryl, aryl, alkylcarbonyl, arylcarbonyl, alkoxyl or aryloxyl radicals.

These possible substituents are preferably chosen from the group consisting of the substituents —F, —CN, —$CF_3$, —$PO_3H$, —$PO_3M$, —$SO_3H$ and —$SO_3M$ and the mixtures of these substituents.

According to another preferred embodiment, the triazine polymer of the invention comprises, in addition to the base structural units comprising at least the central moiety of formula (I), additional structural units of formula (II) chosen from the formulae (II-A), (II-B) and (II-C):

$$—Ar_6—X_3—Ar_7— \quad (II\text{-}A)$$

$$—Ar_8—X_4—(CF_2)_m—X_5—Ar_9— \quad (II\text{-}B)$$

$$—Ar_{10}—CO—Ar_{11}—(CF_2)_m—Ar_{12}—CO—Ar_{13}— \quad (II\text{-}C)$$

in which:

the symbols $Ar_6$, $Ar_7$, $Ar_8$, $Ar_9$, $Ar_{10}$, $Ar_{11}$, $Ar_{12}$ and $Ar_{13}$, which are identical or different, represent (like the symbols $Ar_1$, $Ar_2$, $Ar_4$ and $Ar_5$ above) a substituted or unsubstituted phenylene group;

the symbols $X_3$, $X_4$ and $X_5$, which are identical or different, represent (like the symbols $X_1$ and $X_2$ above) S, SO or $SO_2$; and m varies from 1 to 20, more preferably from 2 to 20 and in particular from 2 to 8.

Thus, whether or not the phenylene groups $Ar_6$ and $Ar_7$ are identical, the additional structural units of formula (II-A) thus have, as expanded formulae, the three formulae II-A-1, II-A-2 and II-A-3 respectively represented in the appended FIGS. 5A, 5B and 5C.

In the other preferred case where $X_4$ and $X_5$ are identical (whether or not $Ar_8$ and $Ar_9$ are identical), the additional structural units of formula (II-B) thus have, as expanded formulae, the three formulae II-B-1, II-B-2 and II-B-3 respectively represented in the appended FIGS. 6A, 6B and 6C.

Figure 1A:
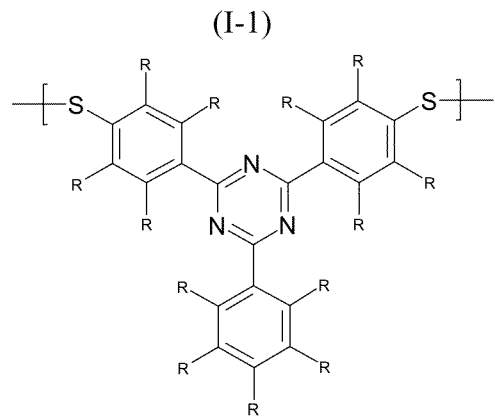
Figure 1B:
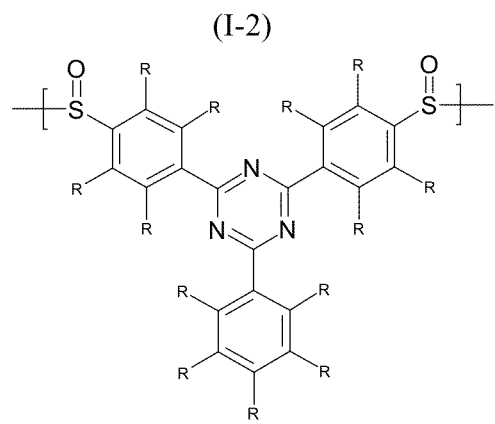
Figure 1C:
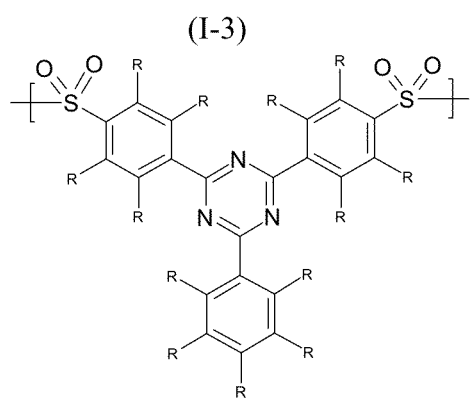
Figure 2A:
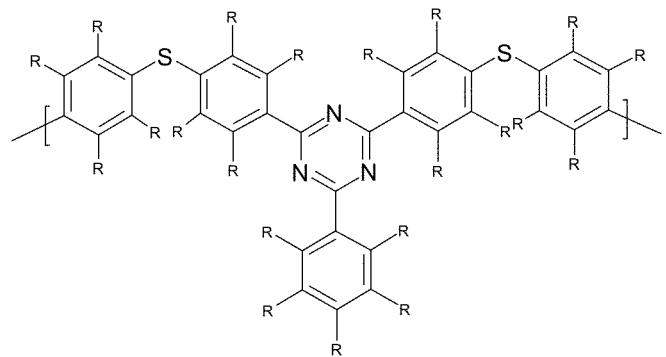
Figure 2B:
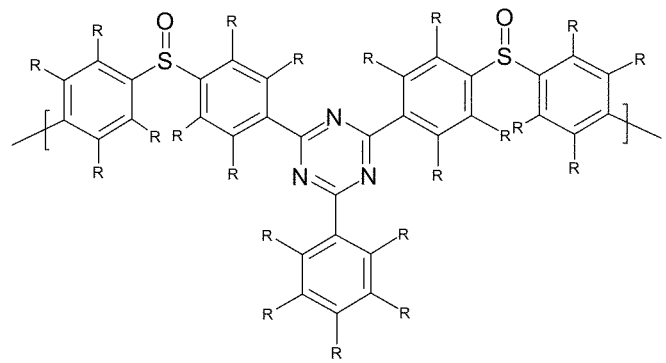
Figure 2C:
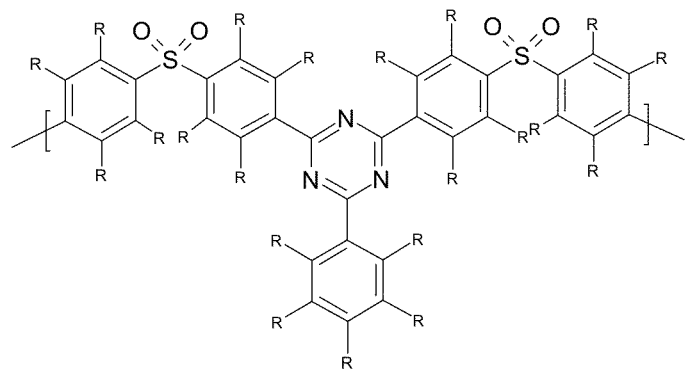
Figure 3A:
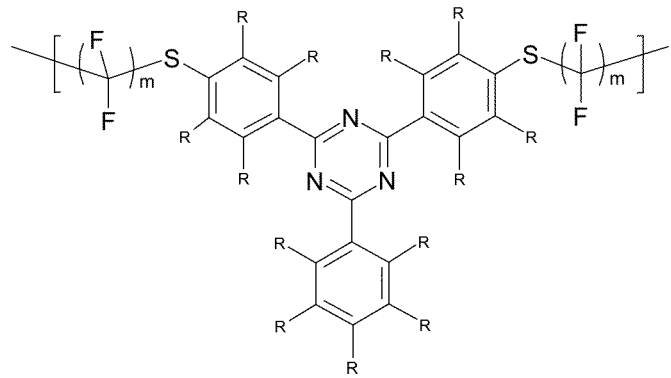
Figure 3B:
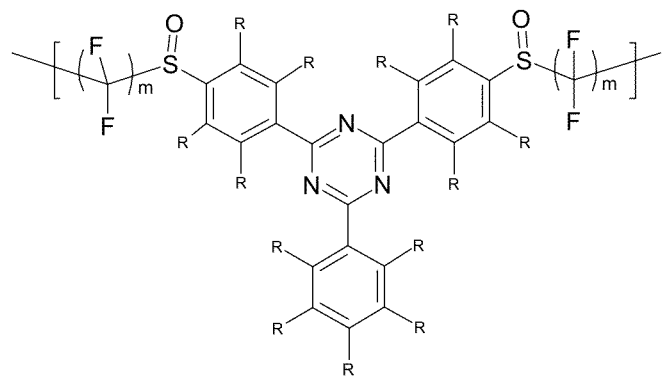
Figure 3C:
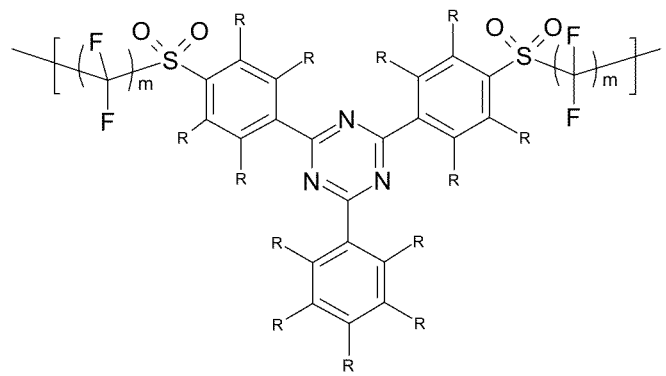
Figure 4A:
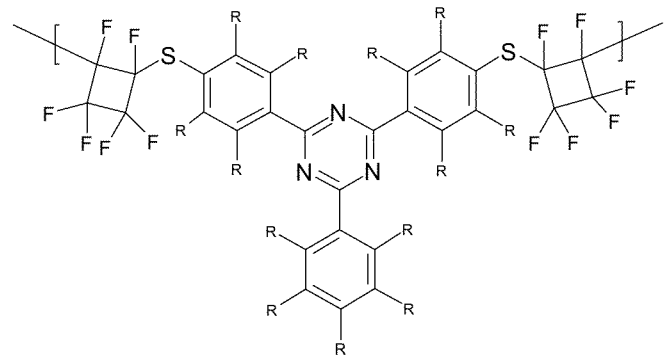
Figure 4B:
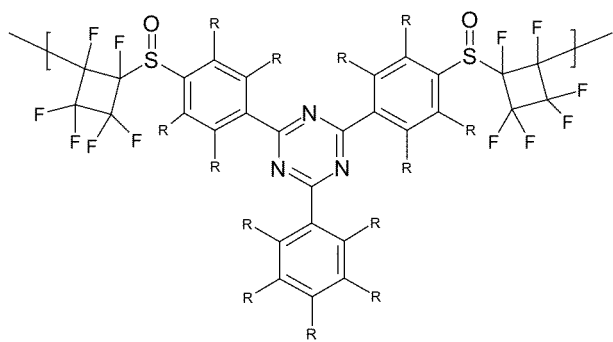
Figure 4C:
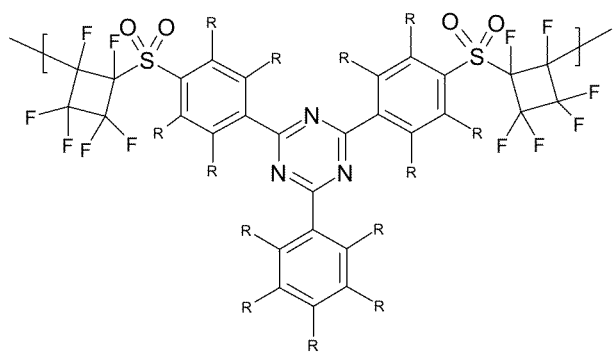
Figure 5A:
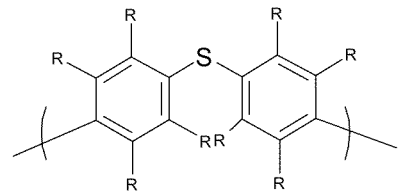
Figure 5B:
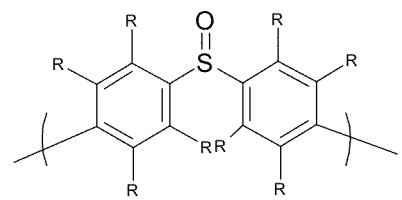
Figure 5C:
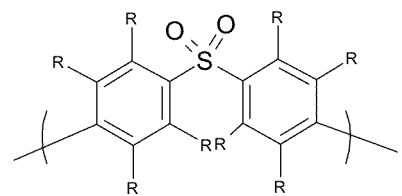
Figure 6A:
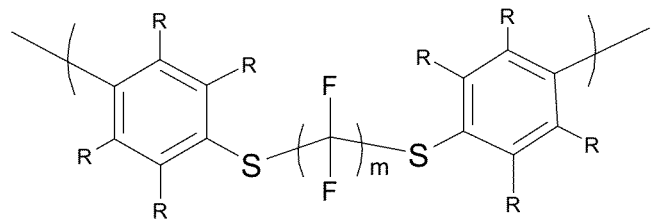
Figure 6B:
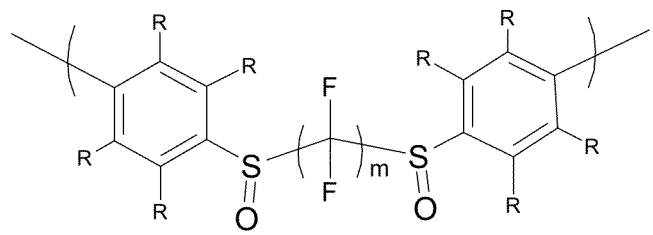
Figure 6C:
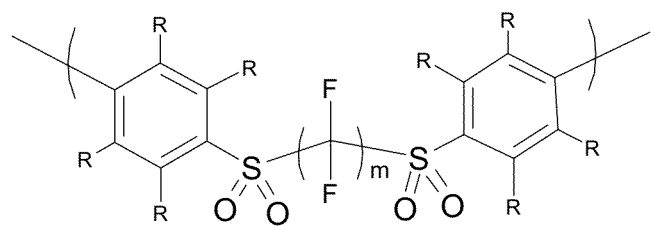
Figure 7A:
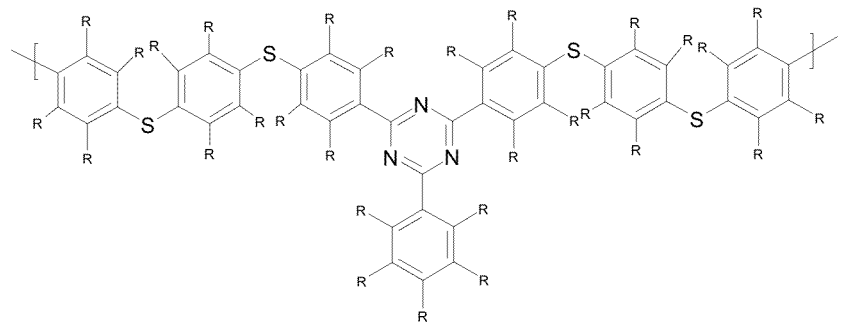
FIGS. 7A, 7B and 7C represent examples of triazine polymer sequences in accordance with the invention, of respective formulae (III-1), (III-2) and (III-3), comprising both base structural units comprising moieties of formula (I-1) as shown above and additional structural units of respective formulae (II-A-1), (II-A-2) and (II-A-3) above.
Figure 7B:
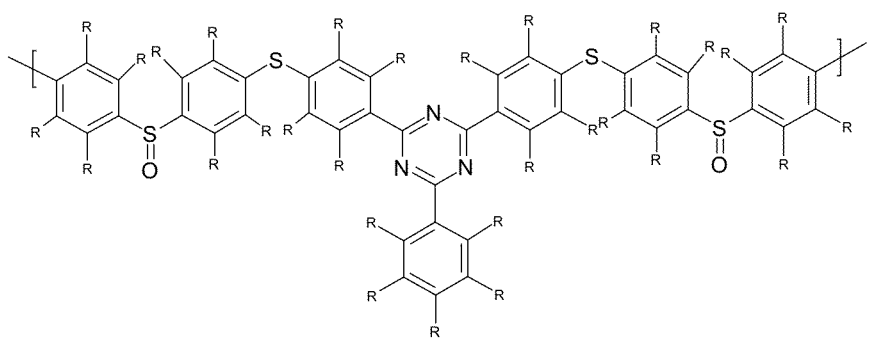
Figure 7C:
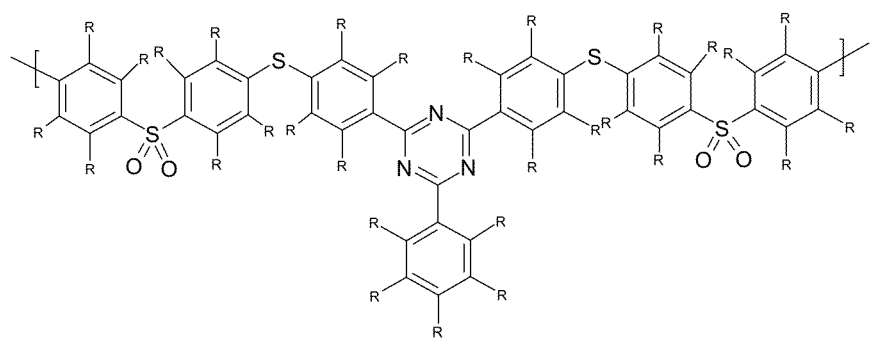
Figure 8A:
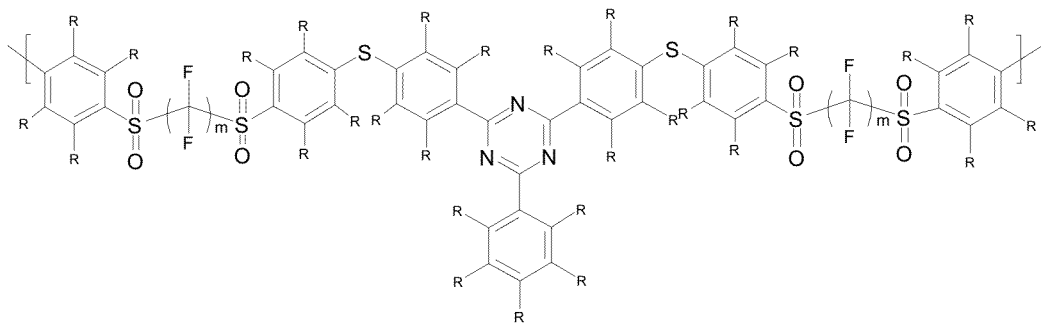
FIGS. 8A, 8B and 8C represent other examples of triazine polymer sequences in accordance with the invention, of respective formulae (IV-1), (IV-2) and (IV-3), comprising both base structural units comprising moieties of respective formulae (I-1), (I-2) and (I-3) as described above and additional structural units of formula (II-B-3) above.
Figure 8B:
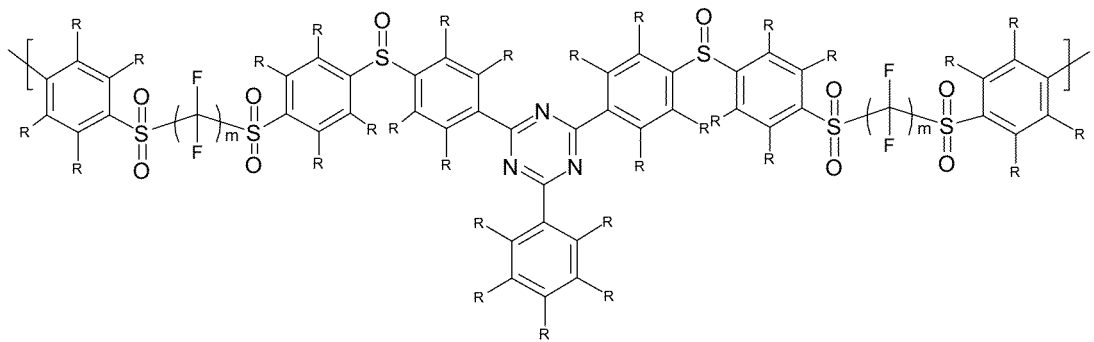
Figure 8C:
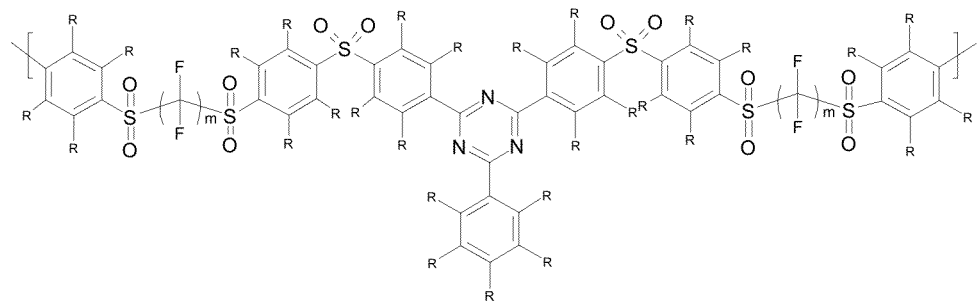

As indicated above for the $Ar_1$, $Ar_2$, $Ar_3$, $Ar_4$ and $Ar_5$ groups, the phenylene groups $Ar_6$, $Ar_7$, $Ar_8$, $Ar_9$, $Ar_{10}$, $Ar_{11}$, $Ar_{12}$ and $Ar_{13}$ may or may not be substituted. When they are substituted, the invention applies in particular to the cases where just one of the phenylene groups per additional structural unit of formula (II) is substituted and also to the cases where several of the phenylene groups per additional structural unit of formula (II) are substituted, it being possible for just one or several identical or different substituents to be present on the same phenylene group(s).

Mention may in particular be made, as examples of possible substituents of the phenylene groups (that is to say, more precisely possible replacements for the hydrogen atoms of these phenylene groups), of the substituents described above:

—F; —Cl; —Br; —CN; —$CF_3$; —$NO_2$; —$N(CH_3)_2$; —COOH; —COOM; —$PO_3H$; —$PO_3M$; —$SO_3H$; —$SO_3M$ (the symbol M representing an alkali metal cation, preferably $Na^+$ or $K^+$);

hydroxyl, alkyl, cycloalkyl, perfluoroalkyl, sulphoalkyl, sulphoaryl, aryl, alkylcarbonyl, arylcarbonyl, alkoxyl or aryloxyl radicals.

These possible substituents are preferably chosen from the group consisting of the substituents —F, —CN, —CF$_3$, —PO$_3$H, —PO$_3$M, —SO$_3$H and —SO$_3$M and the mixtures of these substituents.

The various base structural units comprising moieties of formula (I) and, if appropriate, the additional structural units of formula (II) of the triazine polymer of the invention can be connected to one another via any appropriate chemical bond.

Preferably, at least a portion of the base structural units and, if appropriate, of the additional structural units are connected to one another via bridges chosen from the group consisting of ether (—O—) bonds, thioether (—S—) bonds, sulphoxide (—SO—) bonds, sulphone (—SO$_2$—) bonds and the mixtures of such bonds, due to the high chemical stability of such bonds with regard in particular to the risks of degradation of the polymer by hydrolysis.

More preferably, all the base structural units and, if appropriate, all the additional structural units are connected to one another via bridges chosen from the group consisting of ether (—O—) bonds, thioether (—S—) bonds, sulphoxide (—SO—) bonds, sulphone (—SO$_2$—) bonds and the mixtures of such bonds.

Particularly preferred examples of triazine polymers in accordance with the invention comprising base structural units comprising moieties of formula (I) and, if appropriate, additional structural units of formula (II), connected to one another via ether (—O—) bonds, have been represented in FIGS. 9 to 14, 16 and 17, which will be described in detail subsequently. Other particularly preferred examples of triazine polymers in accordance with the invention comprising base structural units comprising moieties of formula (I), connected to one another via thioether (—S—) or sulphone (—SO$_2$—) bonds, have been represented in FIG. 15, which will be described subsequently.

According to another particularly preferred embodiment of the invention, the triazine polymer of the invention comprises blocked chain endings or ends, preferably blocked by "blocking" groups of the sterically hindered hydrophobic type capable of reducing the solubility of the membrane in water.

More preferably, the chain ends are blocked by blocking groups of aromatic type. Mention will in particular be made, as examples of such aromatic blocking groups, of the groups which are chosen from the group consisting of substituted phenyls, substituted benzophenones, substituted diphenyl sulphones, substituted phenyl perfluoroalkyl sulphones and the mixtures of such groups, these groups being more preferably monosubstituted.

Examples of such monosubstituted aromatic blocking groups, capable of being present on all or a portion of the chain ends of the triazine polymer of the invention, are, for example, those represented in the formulae below (with m an integer preferably varying from 1 to 20):

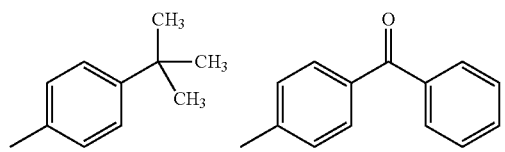

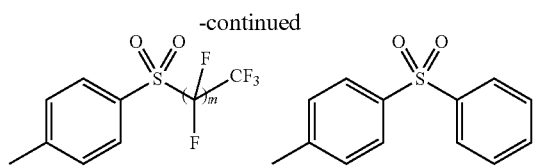

Triazine polymers in accordance with the invention comprising blocked chain ends are illustrated, for example, in FIGS. 24 and 25 (the symbol B indicating, with regard to these figures, the benzophenone group), which will be described in detail subsequently.

To simplify matters, the triazine polymer of the invention in its blocked preferred form, symbolically denoted "P" in the diagrammatic representations below:

B—O—P—O—B

B—S—P—S—B

B—SO—P—SO—B

B—SO$_2$—P—SO$_2$—B comprises, at least one or more preferably at each of the ends of its molecular chains, a blocking group; this blocking group, denoted "B" above, is preferably connected to the polymer P via ether (—O—), thioether (—S—), sulphoxide (—SO—) or sulphone (—SO$_2$—) bridges, such bridges resulting, for example, from the reaction between hydroxyl or thiol (—OH or —SH) terminal groups present, on the one hand, at the ends of the chains of the starting initial triazine polymer (thus, at this stage, in the nonblocked form) and, on the other hand, on the sterically hindered hydrophobic aromatic molecules described above, intended to react with the ends of the chains of the said initial triazine polymer.

The triazine polymer of the invention can be used in particular as electrolyte, especially in a PEM fuel cell, when it is in the sulphonated form.

The term "sulphonated polymer" is understood to mean, by definition and in a well known way, a polymer carrying one or more sulphonic (—SO$_3$H) or sulphonate (—SO$_3$M) groups or mixtures of such groups, M representing a cation of an alkali metal preferably chosen from lithium (Li), caesium (Cs), sodium (Na) and potassium (K), more preferably from sodium (Na) and potassium (K). It will be restated briefly here that, in a well known way, it is the sulphonic groups which, in the PEM cell, provide the proton conductivity of the polymer.

The appended FIGS. 9 to 17 represent several preferred examples of triazine polymers in accordance with the invention and also various possible schemes for the synthesis of these polymers.

Figure 9:
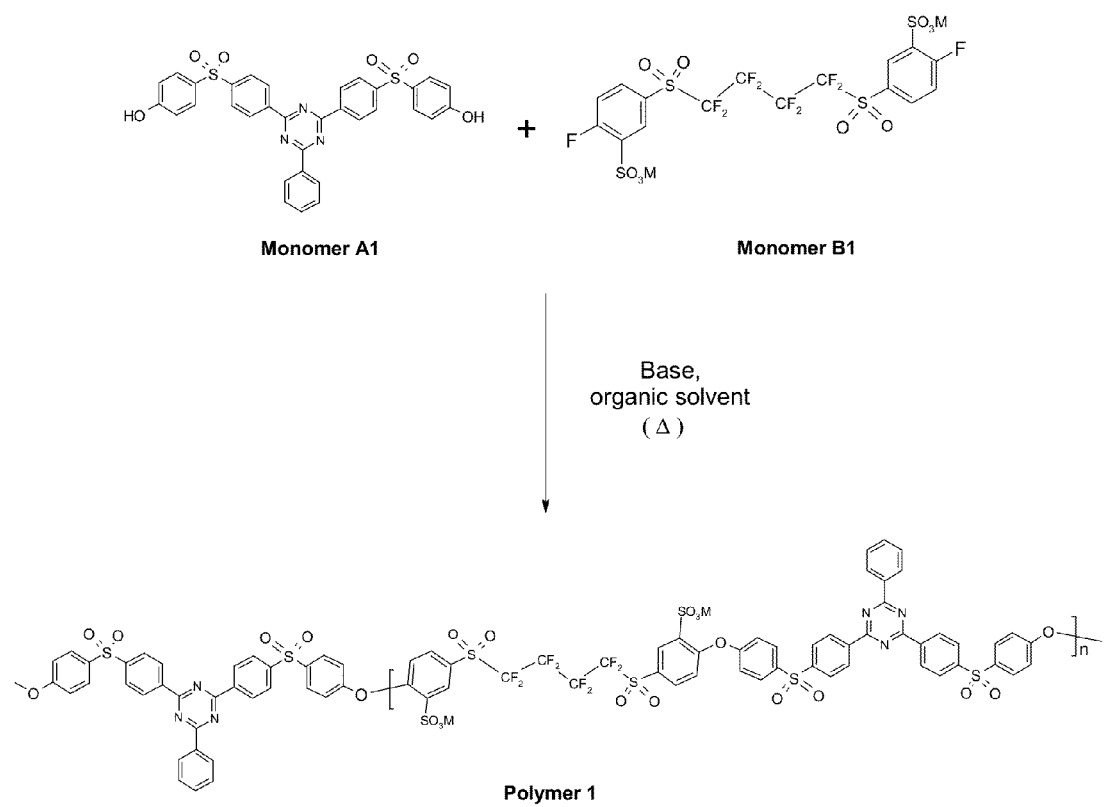

The triazine polymer (hereinafter referred to as "Polymer 1") of FIG. 9 has the characteristic of comprising base structural units with moieties of formula (I-A-3) and additional structural units of formula (II-B-3) connected to one another via ether (—O—) bridges. It may be noted that Polymer 1 is here present in the sulphonated form, the sulphonate —SO$_3$M groups (M preferably being Na$^+$ or K$^+$) being provided by the additional structural units of formula (II-B-3). This Polymer 1 can be prepared by polycondensation of the monomers A1 and B1 (disulphonated B1) represented in FIG. 9, in the presence of a base and of an organic solvent, according to a procedure which will be described in detail later.

Figure 10:
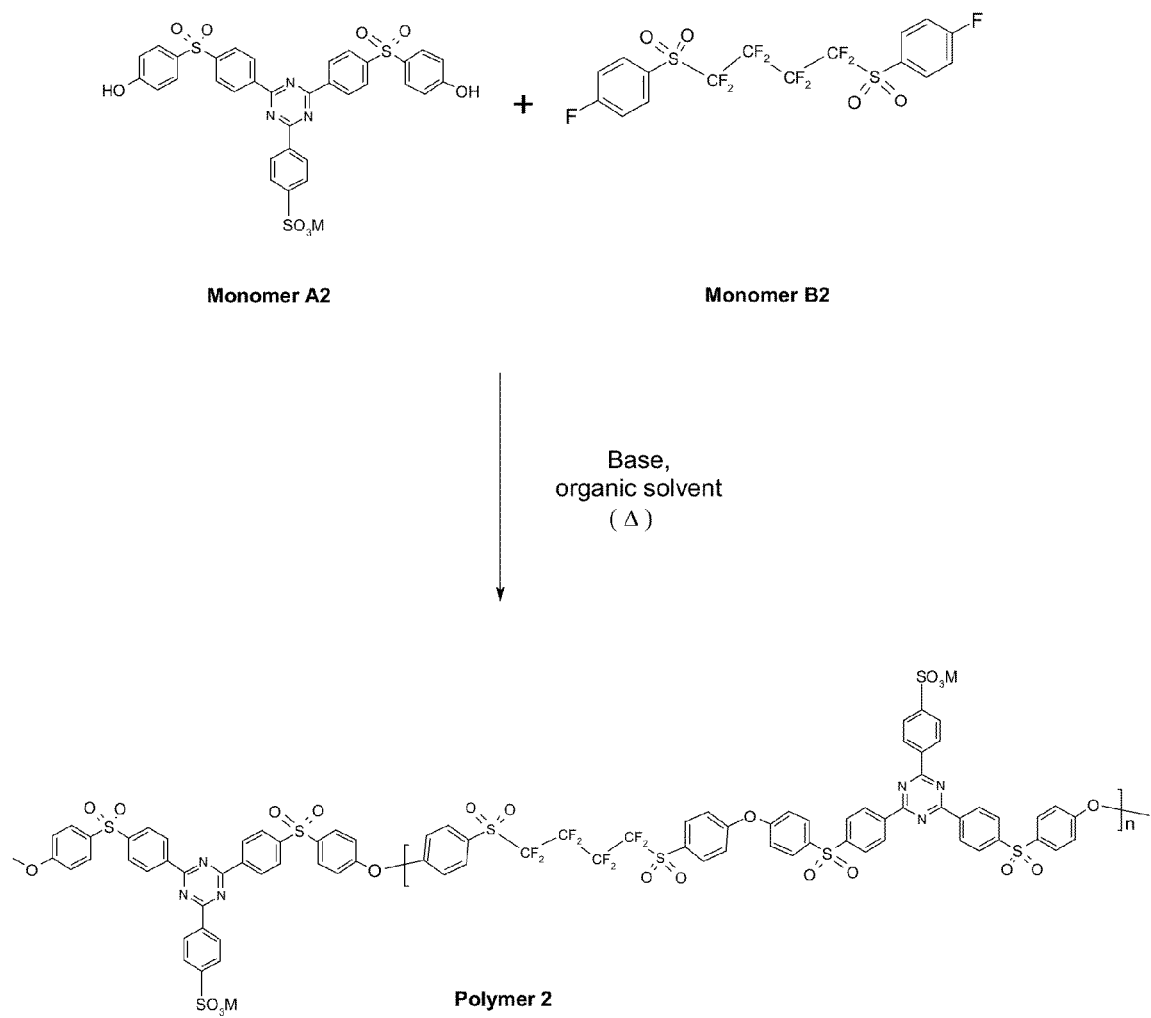

The triazine polymer (hereinafter referred to as "Polymer 2") of FIG. 10 comprises base structural units with moieties of formula (I-A-3) and additional structural units of formula (II-B-3) connected to one another via ether bridges, like the preceding Polymer 1. It may be noted that Polymer 2 is in a sulphonated form, the sulphonate —$SO_3M$ groups (M preferably being $Na^+$ or $K^+$) being here provided by the base structural units with moieties of formula (I-A-3). This Polymer 2 can be prepared by polycondensation of the monomers A2 (sulphonated) and B2 represented in FIG. 10, as above for Polymer 1, in the presence of an appropriate base and of an appropriate organic solvent.

Figure 11:
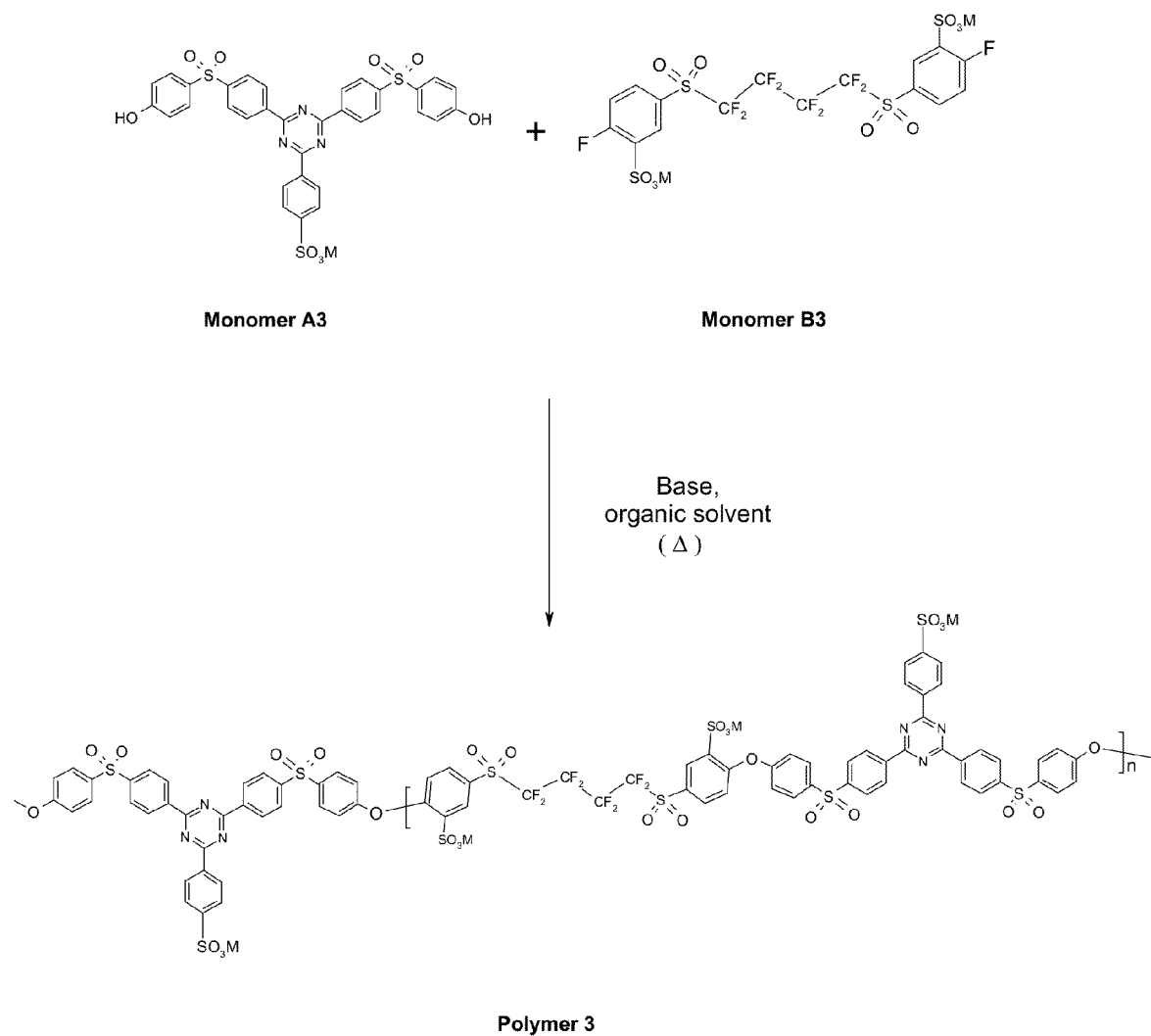

As in the case of the preceding polymers, the triazine polymer (hereinafter referred to as "Polymer 3") of FIG. 11 comprises both base structural units with moieties of formula (I-A-3) and additional structural units of formula (II-B-3) connected to one another via ether bridges. The Polymer 3 is provided here in the sulphonated form, its sulphonate groups (—$SO_3M$, M preferably being $Na^+$ or $K^+$) being provided both by the base structural units with moieties of formula (I-A-3) and by the additional structural units (II-B-3). This Polymer 3 can be prepared by polycondensation of the monomers denoted A3 (sulphonated, identical to the monomer A2) and B3 (disulphonated, identical to the monomer B1) represented in FIG. 11, as above for the Polymers 1 and 2, in the presence of an appropriate base and of an appropriate organic solvent.

The triazine polymers (hereinafter denoted "Polymer 4A" and "Polymer 4B") of FIG. 12 comprise both base structural units with moieties of formula (I-A-1) or (I-A-3), respectively, and additional structural units of formula (II-A-3), all connected to one another via ether bridges, the sulphonate groups (—$SO_3M$, M preferably being $Na^+$ or $K^+$) being, for example, carried by a portion of the additional structural units of formula (II-A-3).

Figure 12:
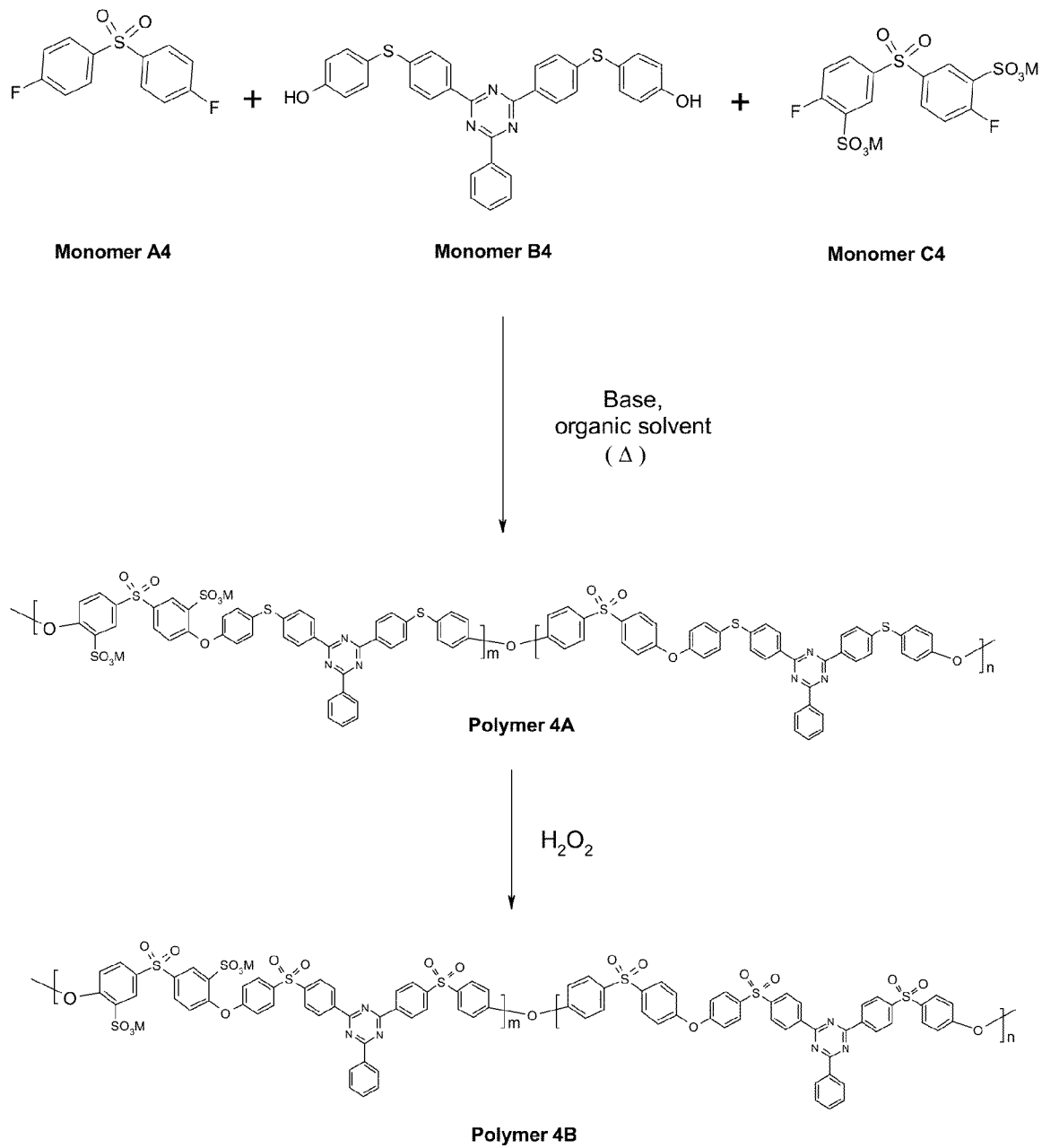

These Polymers 4A and 4B can be prepared by copolymerization of three monomers denoted A4, B4 and C4 (disulphonated monomer C4) in FIG. 12, in the presence of an appropriate base and of an appropriate organic solvent, as above for the Polymers 1, 2 or 3. The first polymer (Polymer 4A) thus obtained is subsequently oxidized with hydrogen peroxide (aqueous hydrogen peroxide solution) in order to obtain the final polymer (Polymer 4B). The monomers A4 and C4 are known, commercially available, the monomer B-4 is prepared according to a procedure which will be described in detail subsequently.

Figure 13:
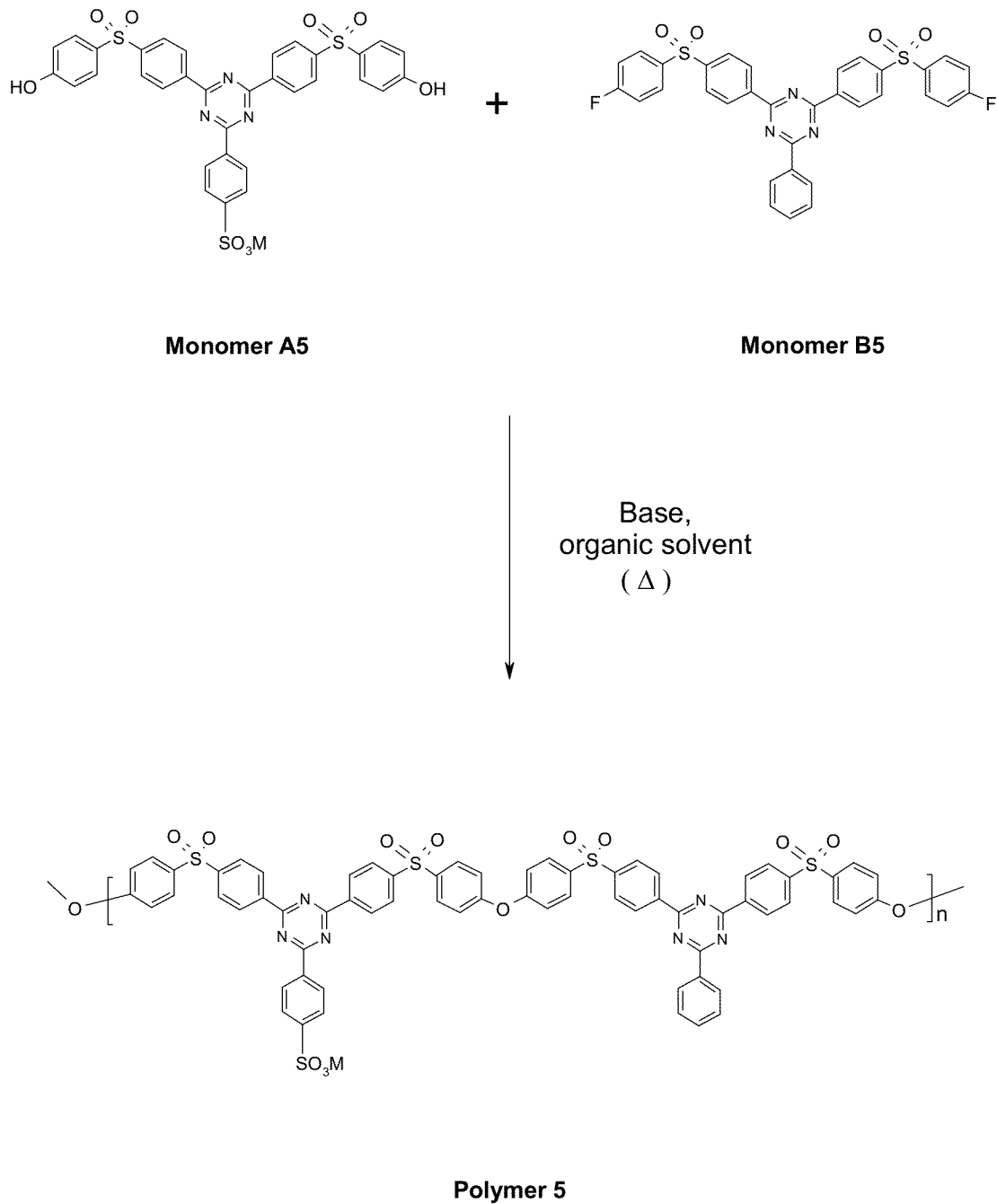
Figure 14:
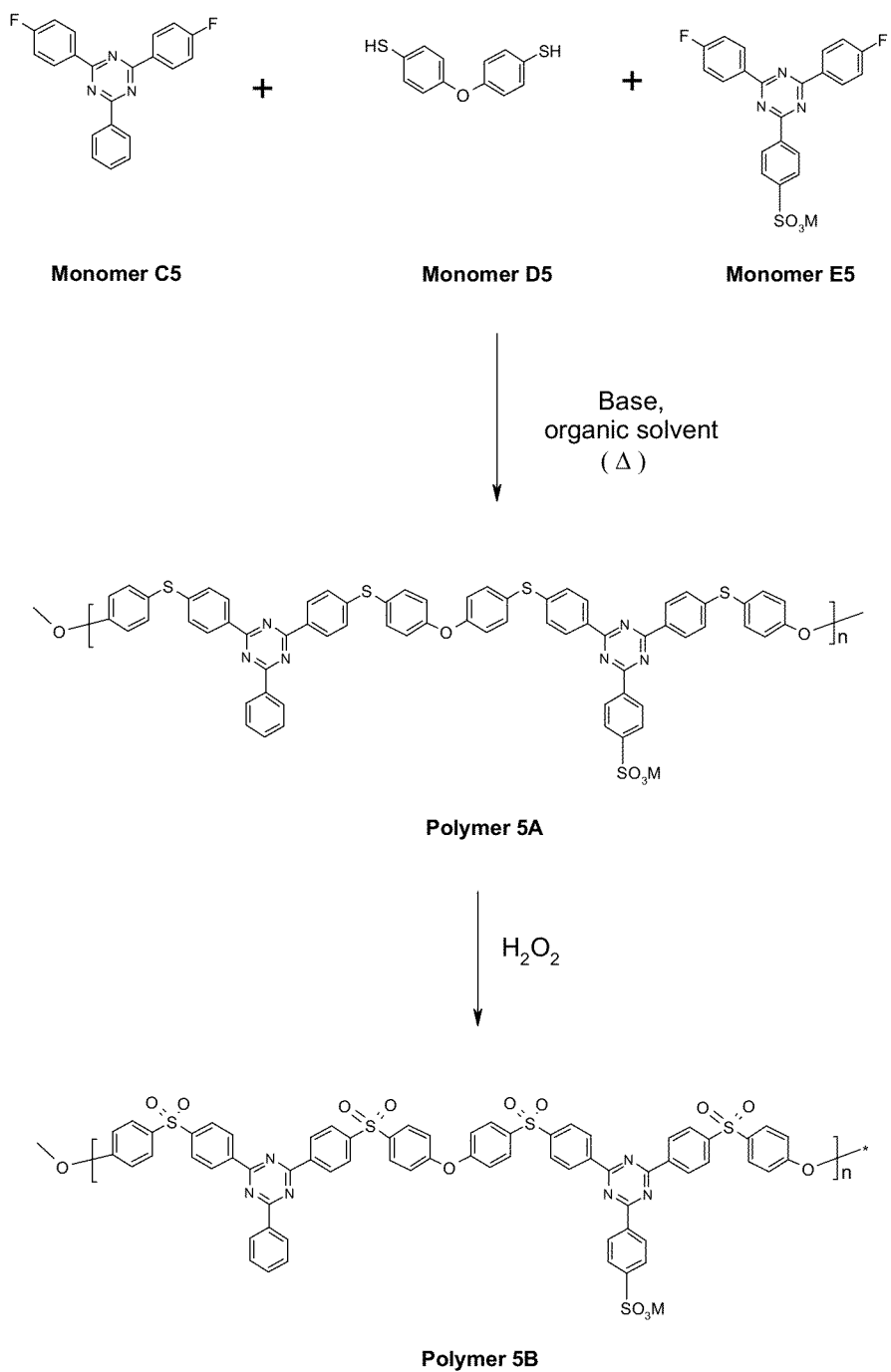

The triazine polymer (denoted "Polymer 5") of FIG. 13 comprises only base structural units with moieties of formula (I-A-3) connected to one another via ether bridges, the sulphonate groups (—$SO_3M$, M preferably being $Na^+$ or $K^+$) being, for example, carried by a portion only of these base structural units with moieties of formula (I-A-3). This Polymer 5 can be prepared by polycondensation of the two triazine monomers denoted A5 (monosulphonated, identical to the monomer A2) and B5 (identical to the monomer B1) in FIG. 13, in the presence of an appropriate base and of an appropriate organic solvent.

FIG. 14 again illustrates another example of a possible process for the synthesis of Polymer 5 by polycondensation of two triazine monomers, here denoted C5 and E5 (monosulphonated monomer E5), and of an aromatic dithiol monomer (monomer D5), as represented in FIG. 14. The polymer (Polymer 5A) obtained in a first step comprises only base structural units with moieties of formula (I-A-1) connected to one another via thioether bridges. The Polymer 5A is subsequently oxidized by hydrogen peroxide in order to obtain the final polymer (Polymer 5B, identical to the preceding Polymer 5).

Figure 15:
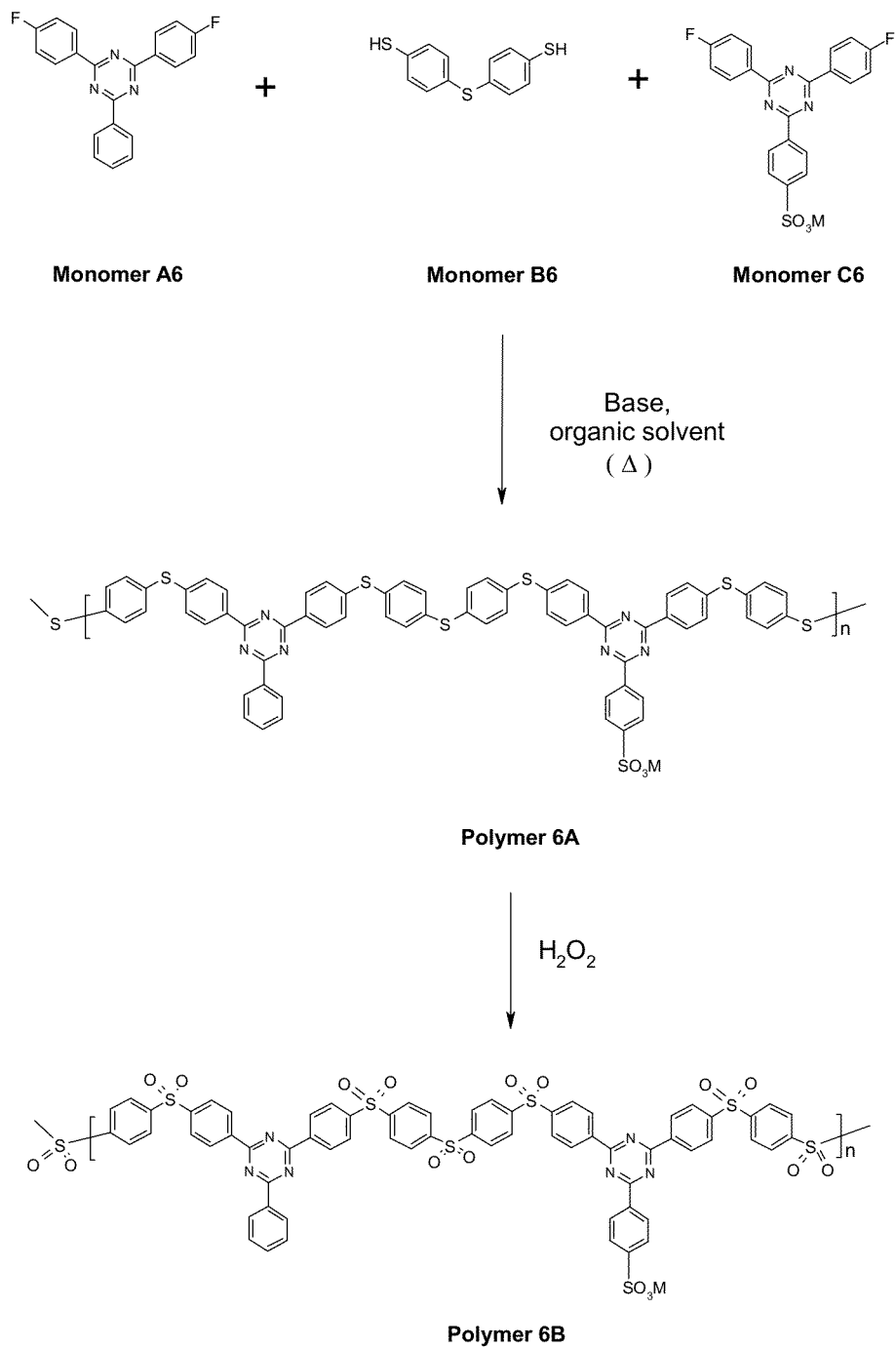

The triazine polymer ("Polymer 6B") of FIG. 15 for its part comprises only base structural units with moieties of formula (I-A-3) connected to one another via sulphone (—$SO_2$—) bridges, the sulphonate groups ($SO_3M$, M preferably being $Na^+$ or $K^+$) being, for example, carried by a portion only of the base structural units with moieties of formula (I-A-3). This Polymer 6B can be prepared by polycondensation of two triazine monomers, here denoted A6 (identical to the preceding monomer C5) and C6 (disulphonated monomer C6, identical to the preceding monomer E5), and of an aromatic dithiol monomer (monomer B6, identical to the monomer D5), as represented in FIG. 15, in the presence of an appropriate base and of an appropriate organic solvent. The polymer (Polymer 6A) obtained in a first step comprises only base structural units with moieties of formula (I-A-1) connected to one another via thioether bridges. The Polymer 6A is subsequently oxidized with hydrogen peroxide in order to obtain the final polymer (Polymer 6B) comprising only base structural units with moieties of formula (I-A-3) connected to one another, this time, via sulphone bridges.

Figure 16:
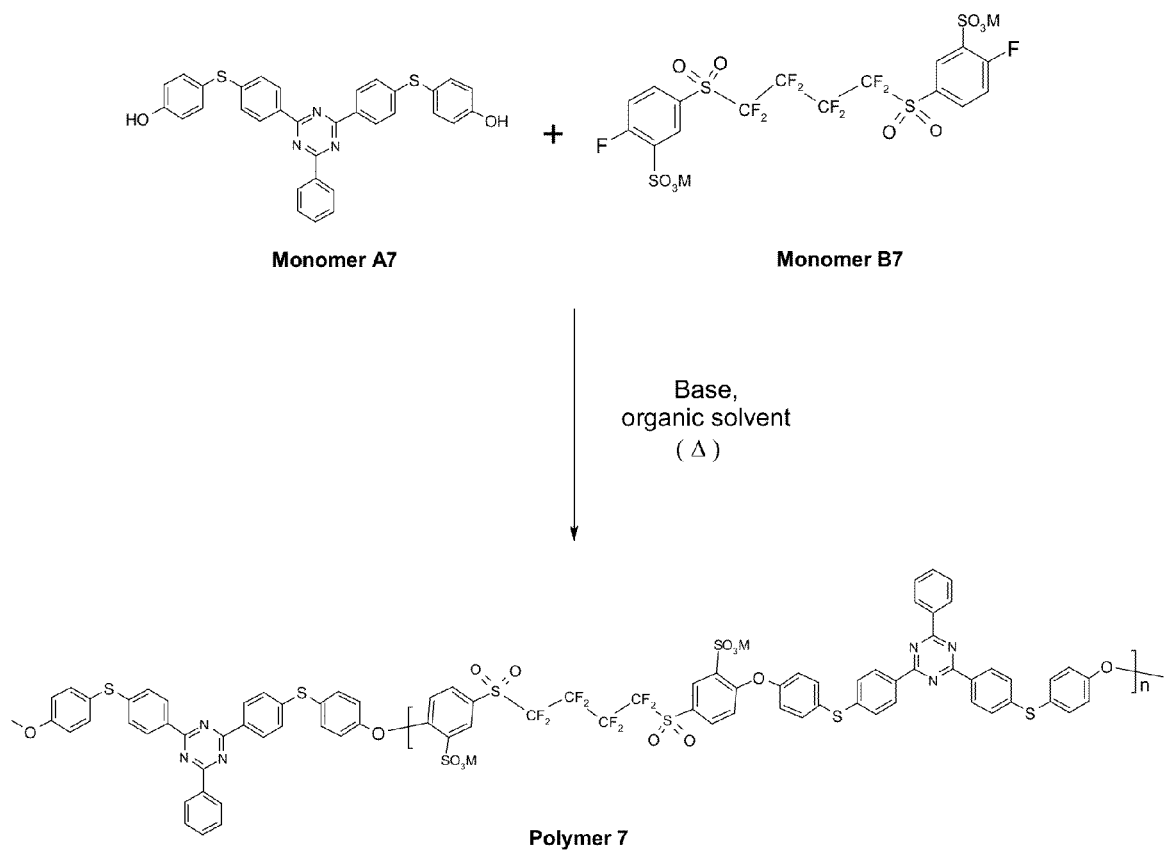

The triazine polymer (hereinafter denoted "Polymer 7") of FIG. 16 comprises both base structural units with moieties of formula (I-A-1) and additional structural units of formula (II-B-3) connected to one another via ether bridges. The Polymer 7 is provided here in the sulphonated form, the sulphonate groups ($SO_3M$, M preferably being $Na^+$ or $K^+$) being provided by the additional structural units (II-B-3). This Polymer 7 can be prepared by polycondensation of the monomers A7 and B7 (disulphonated B7, identical to the preceding monomer B1), as represented in FIG. 16, as indicated above in the presence of an appropriate base and an appropriate organic solvent, according to a procedure which will be described in more detail subsequently.

The triazine polymer (hereinafter denoted "Polymer 8") of FIG. 17 comprises both base structural units with moieties of formula (I-A-1) and additional structural units of formula (II-C) connected to one another via ether bridges. The Polymer 8 is provided here in the sulphonated form, the sulphonate groups ($SO_3M$, M preferably being $Na^+$ or $K^+$) being provided by the monomer B8. This Polymer 8 can be prepared by polycondensation of the monomers A8 (identical to the preceding monomer A7) and B8 (disulphonated) represented in FIG. 17, as indicated above in the presence of an appropriate base and of an appropriate organic solvent, according to a procedure which will be described in more detail subsequently.

According to a preferred embodiment, the symbols $X_1$, $X_2$, $X_3$, $X_4$ and $X_5$ all represent the $SO_2$ group. According to another preferred embodiment, the triazine polymer of the invention comprises one or more sulphonic or sulphonate groups which are carried:

by at least one phenyl or phenylene group or, if appropriate, by at least one substituent of the said phenyl or phenylene groups, in at least one of the base structural units of the said polymer or in at least one of the additional structural units of the said polymer; or by at least one of its perfluorinated hydrocarbon linkages or, if appropriate, by at least one of the substituents of the said perfluorinated hydrocarbon linkages, in at least one of the base structural units of the said polymer or in at least one of the additional structural units of the said polymer.

V. EXAMPLES OF THE IMPLEMENTATION OF THE INVENTION

The tests which follow first of all describe in detail the synthesis of the monomers A1, B1 (also called B7), A7 (also called B4) and B8, and then that of the Polymer 1, Polymer 7 and Polymer 8.

Subsequently, the Polymer 1 and Polymer 8 are characterized and tested as a proton-conducting membrane in a fuel cell of the PEM type.

In the present description, unless expressly indicated otherwise, all the percentages (%) shown are percentages by weight.

V-1. Synthesis of the Monomer A1

The monomer A1 is 2,4-[4(4-hydroxyphenylsulphonyl) phenyl]-6-phenyl-1,3,5-triazine, the formula of which (already reproduced in FIG. 9) is as follows:

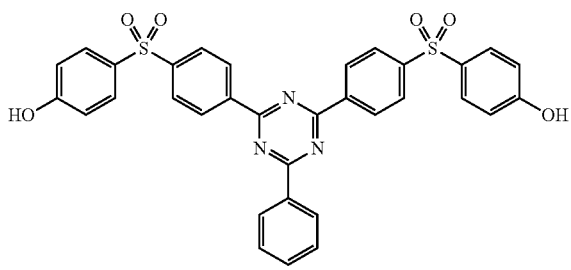 [SMILES: O=S(=O)(c1ccc(O)cc1)c1ccc(-c2nc(-c3ccccc3)nc(-c3ccc(S(=O)(=O)c4ccc(O)cc4)cc3)n2)cc1]

This monomer A1 (or Compound 3 in FIG. 18) was prepared according to the procedure represented diagrammatically in FIG. 18, in three successive stages, as described in detail below.

V-1-A) Stage 1

During a first stage, the Compound 1 or 2,4-bis(p-fluorophenyl)-6-phenyl-1,3,5-triazine is prepared according to the procedure which follows and which is represented diagrammatically in FIG. 18A.

This procedure, although different, is inspired by the process for the synthesis of chlorinated triphenyltriazines as described in the publication by Spencer R. D. & Beggs B. H, "*Determination of Four Closely Related Triaryl-s-Triazines by Infrared Spectroscopy*", Anal. Chem., 1963, 31(11), 1633-1636.

A 500 ml three-necked round-bottomed flask, equipped with a magnetic bar, a reflux condenser and a thermometer, is dried using a hot-air gun (the apparatus is placed under vacuum). 67.8 g of p-fluorobenzonitrile (0.56 mol) (Fluorochem 99%), 36.0 g of ammonium chloride (0.68 mol), 34.0 g of aluminium chloride (0.26 mol) and 32.0 g of benzoyl chloride (0.22 mol) are placed in the round-bottomed flask under nitrogen. The round-bottomed flask is immersed in an oil bath heated to 158° C. and is left overnight at 150° C. (temperature inside the reaction round-bottomed flask), a gentle stream of nitrogen above the reaction mixture.

The reaction product is cooled to ambient temperature (approximately 23° C.) and hydrolysed by adding 300 g of ice and 60 g of 36% HCl. The solid is filtered off, then dispersed in water and washed until a neutral pH is obtained. The white solid is stirred in 500 ml of methanol heated at reflux for 30 min and then the mixture is allowed to cool to ambient temperature. To finish, the product is filtered off and dried at 60° C. under vacuum.

26.6 g (yield 35%) of Compound 1 are thus obtained, which compound exhibits a melting point (according to DSC) of 254.5° C.

The NMR analysis gives the following results:

$^1$H NMR, 500 MHz (CD$_2$Cl$_2$): 7.30-7.34 (m, 4H), 7.62-7.65 (m, 2H), 7.68-7.70 (m, 1H), 8.79-8.80 (d, 2H), 8.82-8.85 (m, 4H).

V-1-B) Stage 2

During a second stage, the Compound 2 (also known as monomer B4—see, for example, FIG. 12) or 2,4-[4-hydroxyphenylsulphanyl)phenyl]-6-phenyl-1,3,5-triazine is prepared according to the procedure which follows and which is represented diagrammatically in FIG. 18B.

4-Hydroxythiophenol 4-HTP (99%, Acros) is stored under nitrogen and in solid form. The Compound 1 and K$_2$CO$_3$ are dried separately overnight at 150° C. under vacuum. A magnetic bar is placed in a 2 l round-bottomed flask (equipped with a reflux condenser, a thermometer and a nitrogen inlet/outlet). The apparatus is placed under vacuum and dried. A two-way valve is used to replace the vacuum with nitrogen and to continually purge with the inert gas during the addition of the reactants.

The Compound 1 (9.13 g, i.e., 26.44 mmol) and powdered anhydrous K$_2$CO$_3$ (9.69 g, i.e., 1.2 eq. with respect to the 4-HTP) are added, while still hot (at the end of drying), to the apparatus purged with nitrogen. This is followed by the addition of 750 ml of anhydrous DMSO. The suspension obtained is subsequently purged for at least 15 min with a stream of nitrogen inside the solution.

The required amount of 4-HTP (7.45 g or 58.42 mmol, i.e., 2.2 eq.), in the liquid form, is transferred using a 10 ml plastic syringe, weighed directly inside the syringe and injected into the reaction mixture. Once all the reactants are added, the nitrogen is purged continuously above the solution. The mixture is heated at 100° C. overnight (20 hours) with continuous stirring and is then allowed to cool to ambient temperature.

The product cannot be purified in a single stage: approximately 250 ml of aliquot fraction of the reaction mixture are withdrawn and poured into a separation funnel (3 liters) containing 2.6 liters of ethyl acetate/water (ratio by weight 1/1). The remainder of the product is kept under a continual stream of nitrogen. The mixture placed in the separation funnel is shaken (the colour changes from orange to lemon yellow) and the desired product is extracted into the ethylene acetate phase (the DMSO/H$_2$O phase comprises only traces of the desired product). The organic phase is washed with 100 ml of an NaHCO$_3$ solution, which stage is followed by washing with 100 ml of H$_2$O; the organic phase is subsequently dried with anhydrous MgSO$_4$. The process is repeated twice with the other two remaining 250 ml aliquots of the reaction mixture.

The ethyl acetate phase is evaporated using a rotary evaporator; a viscous slightly orange liquid, like honey, remains (comprising a small amount of DMSO). The residual DMSO is removed at 100° C. under reduced pressure. A small amount of acetone (10 ml) is added, followed by 40 ml of diethyl ether. The solid immediately becomes cream white and is filtered off on a ceramic filter. The residual thiol is removed from the reaction product by column chromatography using hexane/CH$_2$Cl$_2$/ethyl acetate/methanol (ratios by weight 4/2/1/1) as mobile phase.

13.1 g (i.e., a yield of approximately 89%) of the Compound 2 are thus obtained.

The NMR analysis gives the following results:

$^1$H NMR (500 MHz) $d_6$-DMSO: 6.93-6.95 (d, 4H), 7.17-7.19 (d, 4H), 7.42-7.44 (d, 4H), 7.58-7.60 (m, 2H), 7.65-7.68 (m, 1H), 8.49-8.50 (d, 4H), 8.61-8.63 (d, 2H), 10.04 (s, 2H).

The molecular weight of the product, as measured by "MALDI" (Matrix-assisted Laser Desorption/Ionization) mass spectrometry (positive mode; dithranol matrix), is equal to 558.1 (calculated theoretical value equal to 557.7).

V-1-C) Stage 3

Finally, during a third and final stage, the Compound 3 (monomer A1) is prepared according to the procedure which follows and which is represented diagrammatically in FIG. 18C.

A 250 ml three-necked round-bottomed flask is equipped with a magnetic bar, a thermometer, a reflux condenser and an opening used for the addition of the reactants. A suspension is prepared by adding 6.69 g of Compound 2 (12 mmol) to 150 ml of glacial acetic acid. Once the reactant has been added, the suspension is heated to 70° C. The reactant dissolves, giving a slight transparent yellow coloration. Subsequently, 18.0 g of 50% hydrogen peroxide (264 mmol) are introduced dropwise into the reaction (no exothermicity is observed). The solution is heated at reflux (100° C.) for 1 hour (slightly yellow coloration). Thin layer chromatography (silica plate) in $CH_2Cl_2$/ethyl acetate/methanol (ratios by weight 3/1/1) makes it possible to monitor the consumption of the reactant during the reaction (the blue fluorescence of the triazine at 325 nm disappears with the oxidation).

Subsequently, 50 ml of acetic acid are removed by distillation at reduced pressure (vacuum generated by a water pump). After distillation, during the cooling, white crystals begin to precipitate from the solution as soon as the temperature falls below 80° C. The solution is left overnight at ambient temperature in order for the product to crystallize from the acetic acid. The acetic acid is then removed by filtration and the final white product is washed with 300 ml of distilled water. Subsequently, approximately 18 g of wet product thus obtained are transferred into a round-bottomed flask and 75 ml of distilled water are added, the combined mixture being stirred for approximately 15 min. The product is subsequently filtered off and washed up to a value of neutral pH. The product, which is still wet, is dried at 60° C. under vacuum for 2 h and then at 100° C. under vacuum overnight (approximately 12 h).

Purification is carried out by column chromatography using $CH_2Cl_2$/ethyl acetate/methanol (3/1/1) as mobile phase.

The endothermic peak lies at approximately 294° C. ($1_{st}$ DSC run). It is recorded that the monomer immediately polymerizes during the second DSC run; the glass transition temperature (Tg) of the polymer thus formed lies at approximately 145° C.

5.35 g (yield of approximately 80%) of the Compound 3 or monomer A1 are thus obtained.

The NMR analysis gives the following results:

$^1$H NMR (360 MHz) $d_6$-DMSO: 6.99-7.01 (d, 4H), 7.62-7.67 (m, 2H), 7.72 (t, 1H), 7.87-7.90 (d, 4H), 8.13-8.16 (d, 4H), 8.66-8.68 (d, 2H), 8.80-8.83 (d, 4H), 10.77 (s, 2H).

Figure 19:
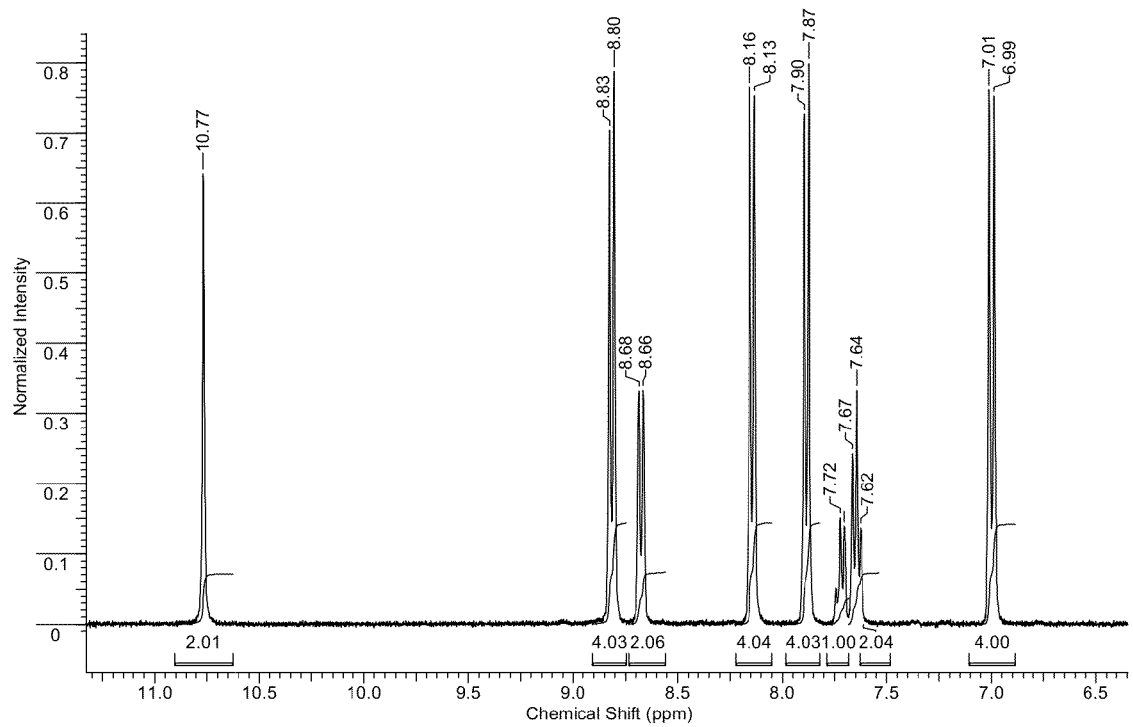

The $^1$H NMR spectrum (360 MHz) of the monomer A1 thus obtained, dissolved in $d_6$-DMSO, is reproduced in FIG. 19.

Finally, the molecular weight of the product, as measured by "ESI" (Electrospray Ionization) mass spectrometry (negative mode; water/acetone 1/1 mixture), is equal to 620.7 (calculated theoretical value equal to 621.7).

V-2. Synthesis of the Monomer B1

The monomer B1 is disulphonated 3,3'-bis(4-fluorophenylsulphonyl)perfluorobutane, the formula of which (already reproduced in FIG. 9) is as follows:

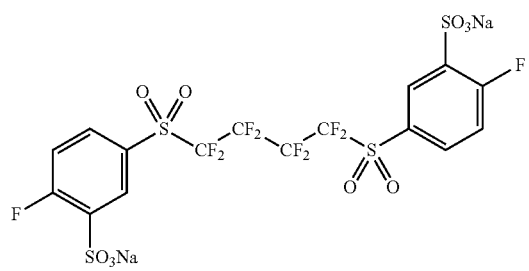

This monomer B1 (or Compound 6 in FIG. 20) was prepared according to the procedure represented diagrammatically in FIG. 20, in three successive stages, as described in detail below.

V-2-A) Stage 1

During a first stage, the Compound 4 or 1,4-bis(4-fluorophenylthio)perfluorobutane is prepared according to the procedure which follows and which is represented diagrammatically in FIG. 20A.

This procedure, although different, is inspired by the process for the synthesis of fluorinated polyethersulphones, as described in the publication by Feiring A. E., Wonchoba E. R. & Arthur R. D., "*Fluorinated Poly(Ether Sulfone)s*", J. Polym. Sci., Part A: Pol. Chem., 1990, 38, 2809-2818.

A mixture of sodium methoxide (13.64 g) (Fluka, 97%) and 4-fluorothiophenol (31.70 g) (Fluorochem, 99%) in 200 ml of anhydrous methanol is heated at reflux for 60 min. After distilling off the methanol, the white solid is kept under nitrogen in the apparatus at ambient temperature.

51.0 g of 1,4-diiodoperfluorobutane (0.110 mol) (Apollo Scientific, 98%) are added to a solution of 37.0 g of sodium 4-fluorophenylthiolate salt (244.83 mmol) in 170 ml of anhydrous DMF, under nitrogen and cooled to 0° C.; an exothermicity occurs and the temperature reaches 40° C. The solution obtained is kept at 40° C. and stirred (approximately 12 hours). It is subsequently heated at 60° C. for 1 hour. The solution, once it has returned to ambient temperature, is diluted with 60 ml of water and then concentrated using a vacuum pump in order to remove 100 ml of solvent. The remaining solution is diluted with water and the lower phase is separated and washed with water. The product is distilled at 120° C. under vacuum. After having removed the impurities, a colourless liquid is recovered, i.e., 37.9 g (75.6%). The remaining traces of impurities (thiol) are removed by column chromatography using hexane as mobile phase, giving a product resembling solid and transparent wax at ambient temperature. The melting point of the product is equal to approximately 50° C. (measured by DSC).

The Compound 4, of formula:

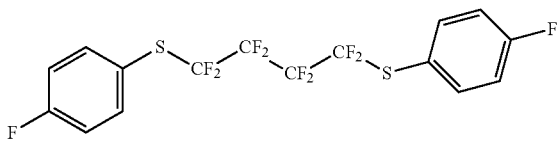

is thus obtained.

The NMR analysis gives the following results:
$^1$H NMR, 500 MHz (CDCl$_3$): 7.09-7.12 (m, 4H), 7.62-7.65 (m, 4H).

V-2-B) Stage 2

Then, during a second stage, the Compound 5 or 1,4-bis(4-fluoro-phenylsulphonyl)perfluorobutane is prepared according to the procedure which follows and which is represented diagrammatically in FIG. 20B.

A one liter two-necked round-bottomed flask, equipped with a reflux condenser, a magnetic bar and a nitrogen inlet, is charged with 31.80 g (80.0 mmol) of Compound 4, 350 ml of glacial acetic acid and 65.4 g (i.e., 413 mmol) of KMnO$_4$ (5.9 eq.). After stirring at ambient temperature for 10 min, the solution is cooled to between 0° C. and 5° C. and then 35 ml of concentrated sulphuric acid are added dropwise during the cooling with the ice bath (temperature of between 0 and 5° C., for 5 hours). The reaction mixture is stirred overnight at ambient temperature and is then poured into 3.5 liters of distilled water. The product is extracted with 7 liters of chloroform. The hydrolysed MnO$_2$ is filtered each time through a filter paper plus a textile filter. The solvent (chloroform/acetic acid) is removed using a rotary evaporator at 50° C. The product is then dissolved in 1 liter of chloroform. The organic phase is subsequently successively washed with 200 ml of a saturated NaHCO$_3$ solution and then with 200 ml of distilled water, and is finally dried with MgSO$_4$. The solvent is removed on a rotary evaporator and then the product is purified by column chromatography using a hexane/ethyl acetate/methanol (15/3/2) mixture as eluent, in order to obtain the Compound 5. The product, in the form of white crystals, is dried overnight at 60° C. under vacuum. It is subsequently recrystallized from acetone in order to obtain transparent crystals. The DSC analysis reveals a melting point of approximately 127° C.

32.6 g (yield 90%) of Compound 5, of formula:

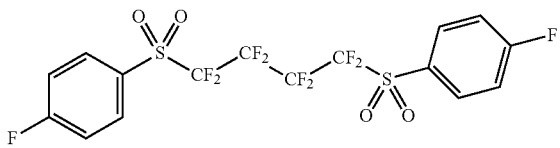

are thus obtained.

The NMR analysis gives the following results:
$^1$H NMR, 500 MHz (CDCl$_3$): 7.36-7.39 (m, 4H), 8.07-8.10 (m, 4H).

V-2-C) Stage 3

Finally, during a third and final stage, the Compound 6 or monomer B1 (disulphonated 3,3'-bis(4-fluorophenylsulphonyl)perfluorobutane) is prepared according to the procedure which follows and which is represented diagrammatically in FIG. 20C.

The Compound 5 (5.0 g, i.e. 9.65 mmol) is placed in a four-necked round-bottomed flask dried with a hot-air gun and then placed under nitrogen (glass-covered magnetic bar). The concentrated sulphuric acid (23.6 g) is subsequently added using a predried graduated glass cylinder. Most of the compound does not dissolve in the sulphuric acid at ambient temperature (the solution becomes slightly purple). Finally, 20.06 g of oleum (Merck product comprising 65% SO$_3$) are added using a predried graduated dropping funnel. The gas outlet bubbler is filled with concentrated sulphuric acid and the gaseous products are purged through an empty trap and then through a trap filled with 10% NaOH. The reaction medium is heated at 120° C. (temperature of the oil bath of 128° C.) with a moderate stream of nitrogen moving above the solution. The reaction is continued at 120° C. overnight (approximately 12 h).

Once the sulphonation is complete, the reaction mixture is cooled to 90° C. and then poured, still hot, into 250 g of ice. The combined mixture is left stirring; once all the ice has melted, 15 of NaCl are added, precipitating the disulphonated monomer. The precipitate is subsequently filtered off and then dried at 80° C. under vacuum. The dry product is subsequently mixed with 250 ml of distilled water and heated up to 90° C. Once all the product has dissolved, the pH is adjusted to 7.0 by adding 1% NaOH (aqueous). The solution is cooled to ambient temperature; the majority of the product has precipitated at that time. The white product is separated from the aqueous phase by filtration. The product remaining in the aqueous phase is precipitated by adding 15 g of NaCl. The product is filtered off and dried overnight at 150° C. under vacuum. No other purification is necessary.

5.92 g (yield 85%) of monomer B1, of formula:

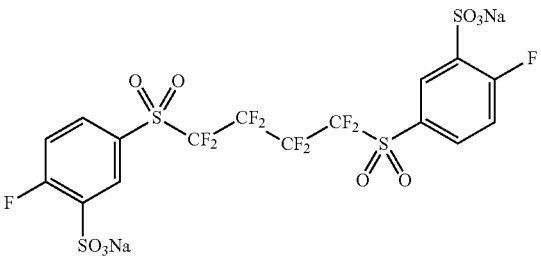

are thus obtained.

Figure 21:
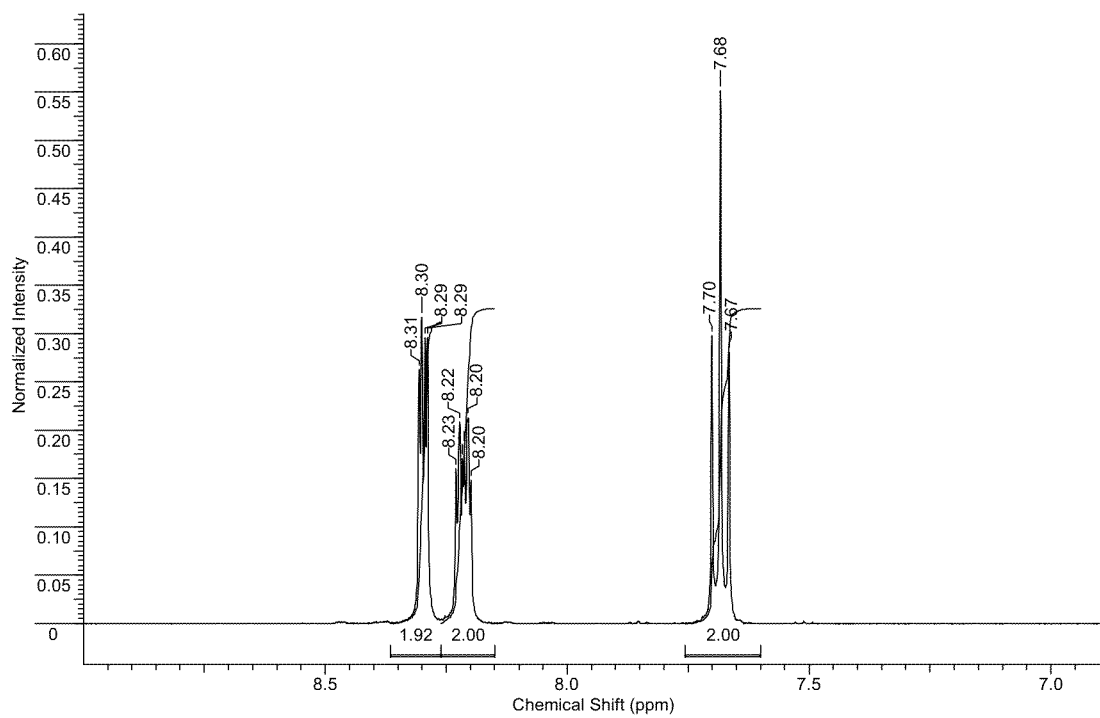

The $^1$H NMR spectrum (500 MHz) of the monomer B1 thus obtained, dissolved in d$_6$-DMSO, is reproduced in FIG. 21.

The NMR analysis gives the following results:
$^1$H NMR, 500 MHz (d$_6$-DMSO): 7.67-7.70 (m, 2H), 8.20-8.23 (m, 2H), 8.29-8.31 (m, 2H).

The product appears pure according to a thin layer chromatography ("TLC") analysis on silica plates using a dichloromethane/ethyl acetate/methanol (7:7:6) mixture.

Finally, the molecular weight of the product, as measured by "ESI" (Electrospray Ionization) mass spectrometry (negative mode (M$^-$—Na$^+$); water/acetone 1/1 mixture) is equal to 698.8 (calculated theoretical value equal to 699.5).

V-3. Synthesis of the Monomer B8

The monomer B8 is disulphonated 1,4-bis(4-fluorobenzophenone)perfluorobutane, the formula of which is as follows:

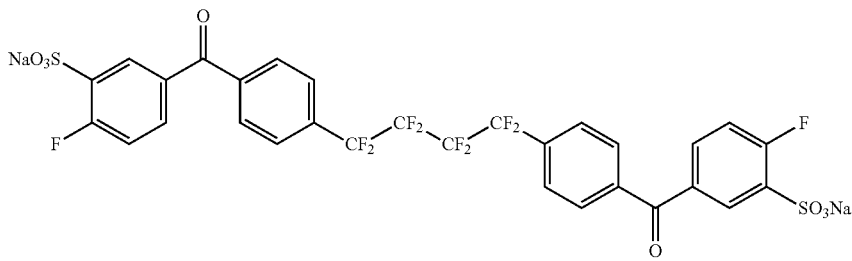

This monomer B8 (or Compound 9) was prepared according to the procedure represented diagrammatically in FIG. 22, in three successive stages, as described in detail below.

V-3-A) Stage 1

During a first stage, the Compound 7 or 4-iodo-4'-fluorobenzophenone is prepared in accordance with FIG. 22A.

4-Iodobenzoyl chloride (30 g, i.e., 112.6 mmol), aluminium chloride (15.0 g, i.e., 112.7 mmol) and fluorobenzene (21.7 g, i.e., 225.8 mmol) are added to a predried 250 ml round-bottomed flask. The mixture is stirred at ambient temperature under a gentle stream of nitrogen overnight. The following day, a solid has appeared and stirring is no longer possible. An additional 20 ml of fluorobenzene are then added and the reactants are mixed at 40° C. (temperature inside the round-bottomed flask) for 3 h. The apparatus is placed at 40° C. under vacuum (water pump) and the excess fluorobenzene is distilled off (for 30 min).

200 g of ice are directly added to the round-bottomed reaction flask, followed immediately by 60 ml of 37% HCl. The solid product thus obtained is reduced to a powder in a ceramic mortar, then stirred in water until a white powder is obtained, finally separated from the HCl solution by filtration (filter paper) and washed until a neutral pH is obtained. The solid is dried at ambient temperature (23° C.) using the water pump, then mixed with 200 ml of ethanol and finally heated at 60° C. (temperature inside the round-bottomed flask) until everything is dissolved. The compound is finally precipitated by cooling the ethanol at ambient temperature.

The final product (approximately 30 g) is purified by silica (300 g) chromatography using a hexane/ethyl acetate mixture (ratio by weight 16/4) as mobile phase. The product is separated from the mobile phase on a rotary evaporator and dried at 80° C. overnight (under vacuum). The final cream-coloured product (25 g) proves to be pure by NMR analysis and TLC chromatography in the hexane/ethyl acetate (ratio 16/4) mixture, with a melting point (measured by DSC) of approximately 137° C.

The Compound 7, of formula:

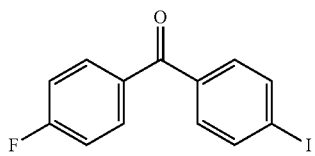 [SMILES: O=C(c1ccc(F)cc1)c1ccc(I)cc1]

is thus obtained.

The NMR analysis gives the following results:

$^1$H NMR, 500 MHz (CD$_2$Cl$_2$): 7.17-7.20 (m, 2H), 7.48-7.50 (m, 2H), 7.80-7.82 (m, 2H), 7.87-7.89 (m, 2H).

V-3-B) Stage 2

Then, during a second stage, the Compound 8 or 1,4-bis(4-fluorobenzo-phenone)perfluorobutane is prepared according to the procedure which follows and which is represented diagrammatically in FIG. 22B.

17.0 g of 4-iodo-4'-fluorobenzophenone (i.e., 52.13 mmol), 2.0 g of 2,2'-bipyridyl (i.e., 12.83 mmol), followed by 11.83 g of 1,4-diiodoperfluorobutane (i.e., 26.06 mmol) and 150 ml of anhydrous DMSO, are introduced into a predried 500 ml four-necked round-bottomed flask. Subsequently, 6.60 g of copper powder are added and the solution is heated at 65° C. (the oil bath is regulated at 74° C.) for 5 h under a nitrogen stream with continual stirring.

The reaction mixture is cooled to ambient temperature and then poured into 500 ml of cold water; the product precipitates and then it is filtered off and dissolved with 1 liter of dichloromethane. The organic phase is subsequently dried with anhydrous Na$_2$SO$_4$. The final product is purified by silica (300 g) chromatography in a dichloromethane/cyclohexane (1/1) mixture.

The Compound 8 in the form of a white powder, of formula:

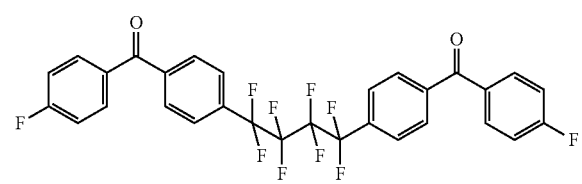 [SMILES: O=C(c1ccc(F)cc1)c1ccc(C(F)(F)C(F)(F)C(F)(F)C(F)(F)c2ccc(C(=O)c3ccc(F)cc3)cc2)cc1]

is thus obtained.

The NMR analysis gives the following results:

$^1$H NMR, 500 MHz (CD$_2$Cl$_2$): 7.19-7.23 (m, 2H), 7.73-7.75 (d, 4H), 7.83-7.87 (m, 8H).

$^{19}$F NMR, 471.3 MHz (CDCl$_3$): 105.04 (m, 2F), 111.44-111.50 (d, 4F), 121.49-121.55 (m, 4F).

The melting point of the product (measured by DSC) is equal to approximately 222° C.

V-3-C) Stage 3

Finally, during a third and final stage, the Compound 9 or disulphonated 1,4-bis(4-fluoro-benzophenone)perfluorobutane is prepared according to the procedure which follows and which is represented diagrammatically in FIG. 22C.

The Compound 8 (2.5 g, i.e., 4.18 mmol) is placed in a 50 ml four-necked round-bottomed flask dried beforehand using a hot-air gun and placed under a stream of nitrogen. 6 g of sulphuric acid (distilled twice, Sigma-Aldrich) and 10 g of oleum (65%, Merck) are added directly to the solid. The reaction medium immediately becomes dark. The exiting gaseous products are purged in an empty glass trap, followed by a trap filled with 30% NaOH. The reaction medium is heated at approximately 130° C. (approximately 138° C. in the oil bath) for 4 h under a moderate stream of nitrogen moving above the solution.

Once the sulphonation is complete, the reaction mixture is allowed to cool to ambient temperature and then it is poured into 63 g of ice and left stirring. Once all the ice has melted, 6.25 g of NaCl are added. The solution is heated at 100° C. and then cooled to ambient temperature in order for the sulphonated monomer to precipitate. The precipitate is subsequently again dissolved in 15 ml of water and again heated at 100° C. in order to convert it back into the liquid form. Once all the product has dissolved, the pH is adjusted to 7.0 by adding 10% NaOH (aq.) dropwise. The solution is allowed to cool to ambient temperature. The cream white solid thus obtained is separated from the aqueous phase by filtration. The product is dried at 150° C. overnight (under vacuum).

The Compound 9 (monomer B8), of formula:

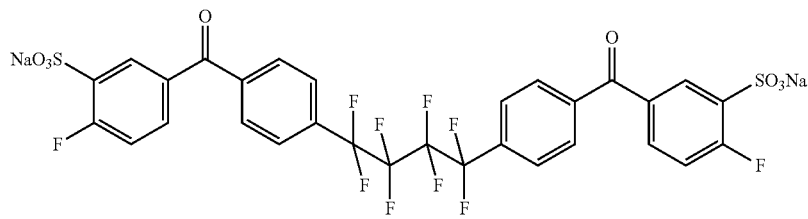

is thus obtained.

The NMR analysis gives the following results:

$^1$H NMR, 500 MHz (d$_6$-DMSO): 7.35-7.39 (m, 2H), 7.80-7.83 (m, 2H), 7.87-7.93 (m, 8H), 8.09-8.10 (d, 1H), 8.11-8.12 (d, 1H).

Figure 23:
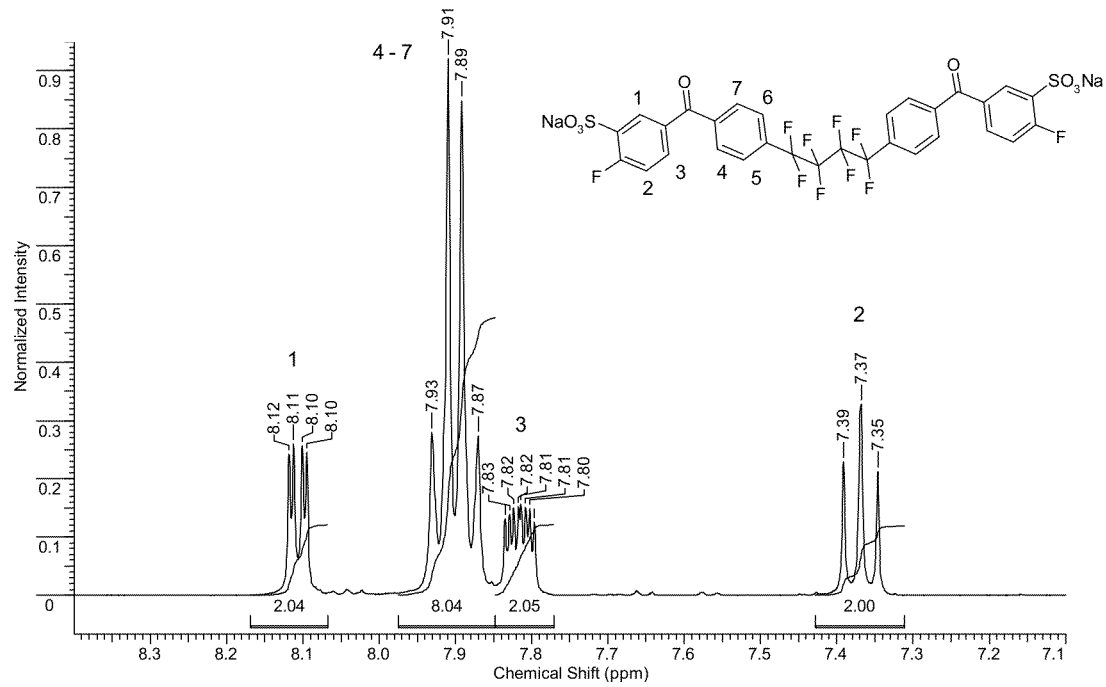

The $^1$H NMR spectrum (500 MHz) of the monomer B8 thus obtained, dissolved in d$_6$-DMSO, is reproduced in FIG. 23.

Finally, the molecular weight of the product, as measured by "ESI" (Electrospray Ionization) mass spectrometry (negative mode; water/acetone 1/1 mixture), is equal to 778.9 (calculated theoretical value equal to 779.6).

V-4. Synthesis of the Polymer 1

Figure 24:
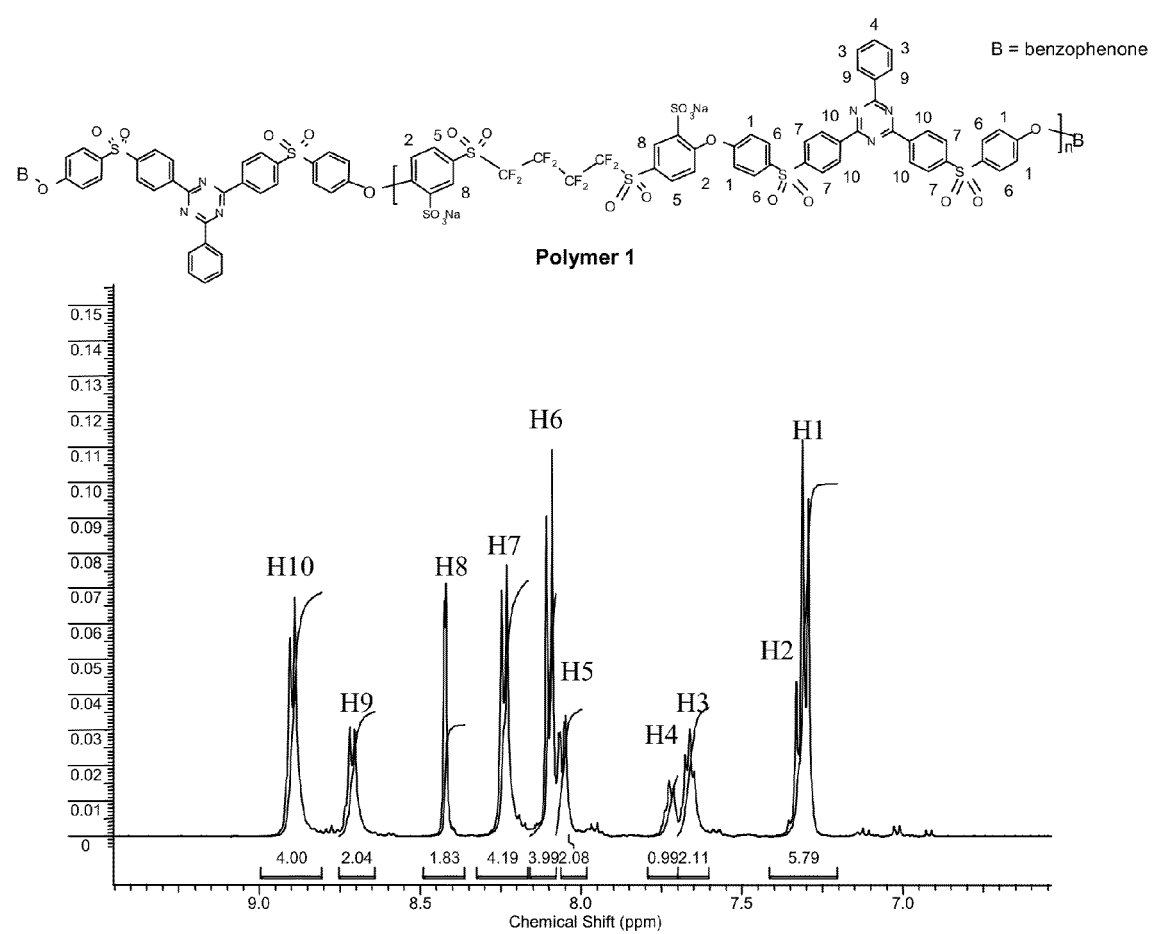

This example describes, in a detailed manner, the synthesis, from the monomers A1 and B1 described above, of the Polymer 1 in the sulphonated form, blocked by benzophenone groups, as represented in FIG. 24.

The monomer A1 is dried at 60° C. under vacuum overnight. The monomer B1 and Na$_2$CO$_3$ are dried separately at 150° C. under vacuum overnight. The three compounds are then mixed and dried at 160° C. under vacuum for one hour. The copolymerization of monomers A1 and B1 takes place in a 100 ml three-necked round-bottomed flask. The round-bottomed flask is equipped with a nitrogen inlet, a thermometer, a magnetic stirrer and a Dean & Stark separator surmounted by a reflux condenser. The glass parts of the apparatus are dried under vacuum using a hot-air gun in order to reach a temperature of at least 100° C. in the round-bottomed reaction flask.

The round-bottomed reaction flask is charged with the monomer A1 (1.89 g, i.e., 3.04 mmol or 1 eq.), the monomer B1 (2.20 g, i.e., 3.04 mmol or 1 eq.), the anhydrous sodium carbonate (0.97 g, i.e., 9.13 mmol or 3 eq.), anhydrous N,N-dimethylacetamide (20 ml) and toluene (4.0 ml, azeotropic agent). The round-bottomed reaction flask is heated at 100° C. in an oil bath for one hour (azeotropic distillation). The valve for circulation of the toluene is subsequently closed and the toluene is distilled off at 100° C. The temperature of the oil bath is subsequently increased to approximately 148° C. and the residual toluene is removed by distillation for an additional 60 min, so that all the toluene is removed from the reaction and so that the temperature increases to 140° C. inside the round-bottomed flask. The toluene is emptied from the Dean & Stark separator and the temperature of the oil bath is increased to approximately 159° C. and maintained at this value overnight. After approximately 20 h, the temperature of the oil bath is increased to approximately 168° C. (approximately 152° C. inside the round-bottomed flask) and the polymerization continues for 4 hours. The temperature of the reaction is brought down to approximately 130° C. inside the round-bottomed flask by removing the round-bottomed flask from the oil bath. 8 mg of 4-fluorobenzophenone dissolved in 5 ml of anhydrous N,N-dimethylacetamide are subsequently added to the reaction using a syringe. The round-bottomed flask is placed back in the oil bath and the reaction continues at approximately 152° C. (168° C. in the oil bath) for a period of an additional 4 h. The reaction mixture is allowed to cool to ambient temperature and the polymer is subsequently poured into 500 ml of 2-propanol (or isopropanol). The fibrous precipitate is recovered by filtration and washed with isopropanol and with water until a neutral pH is obtained (washing out of the residual salts). The product is subsequently dried at 60° C. under vacuum overnight. Purification is carried out by precipitation of the polymer, dissolved in N,N-dimethylacetamide, poured dropwise into diethyl ether with continual stirring.

The formula of the Polymer 1 thus obtained, in the sulphonated and benzophenone-blocked form, is represented in FIG. 24, along with its $^1$H NMR spectrum (500 MHz), dissolved in d$_6$-DMSO.

V-5. Synthesis of the Polymer 7

Figure 25:
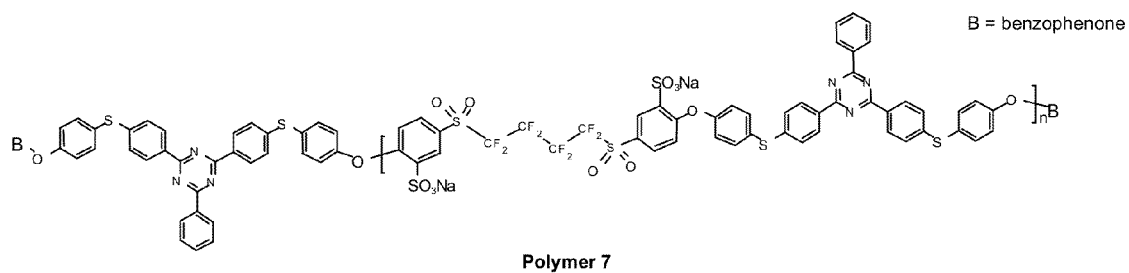
Figure 25:
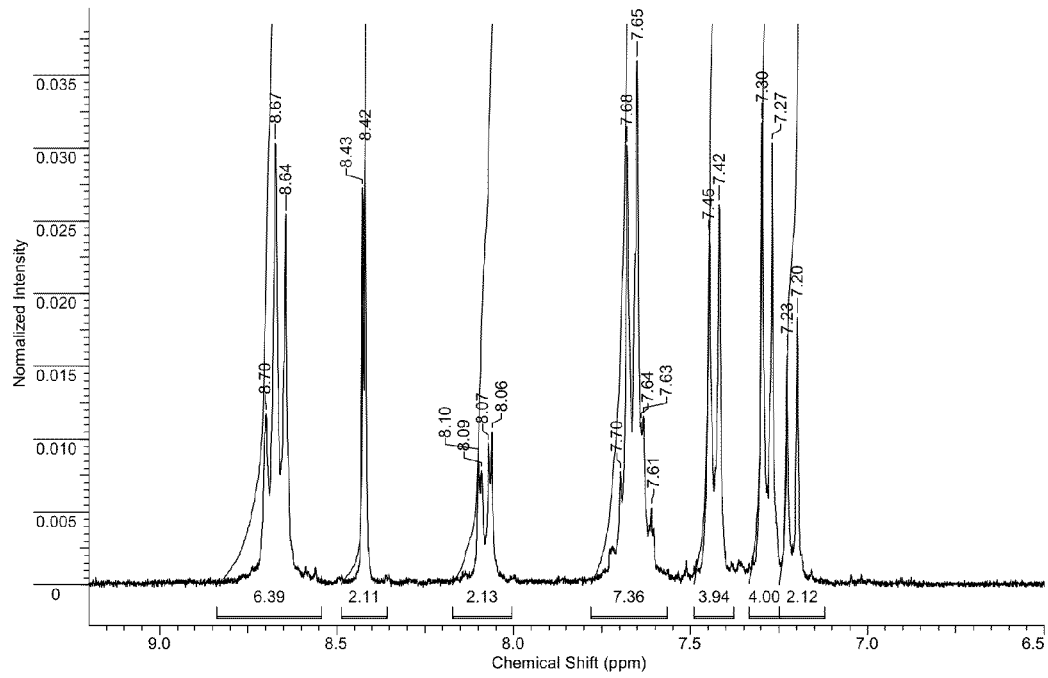

This example describes in a detailed way the synthesis of the Polymer 7, according to a process already commented on in FIG. 16, from the Compound 2 and the Compound 6 described above, this Polymer 7 being obtained here, on the one hand, in the sulphonated form and, on the other hand, in the form blocked by benzophenone groups, as represented in FIG. 25.

The monomer denoted A7 or B4 (Compound 2) is dried at 80° C. under vacuum overnight. The monomer denoted B7 or B1 (Compound 6) and Na$_2$CO$_3$ are dried separately at 150° C., mixed and then the combined mixture is dried at 160° C. under vacuum for one hour. The copolymerization of the monomers A7 and B7 is carried out in a 100 ml three-necked round-bottomed flask. The round-bottomed flask is equipped with a nitrogen inlet, a thermometer, a magnetic stirrer and a Dean Stark separator surmounted by a reflux condenser. The glass parts of the apparatus are dried under vacuum.

For a 50 mol % disulphonation, the round-bottomed flask is charged with the monomer A7 (1.695 g, i.e., 3.04 mmol or 1 eq.), the monomer B7 (2.196 g, i.e., 3.04 mmol or 1 eq.), the anhydrous sodium carbonate (0.968 g, 9.13 mmol, 3 eq.), anhydrous N,N-dimethylacetamide (20 ml) and toluene (4.0 ml, azeotropic agent). The round-bottomed reaction flask is heated at 100° C. in an oil bath for two hours (azeotropic distillation). The valve for circulation of the toluene is subsequently closed and the toluene is distilled off at 100° C. The temperature of the oil bath is subsequently increased to 148° C. and the residual toluene is removed by distillation for an additional one hour, so that all the toluene is removed from the reaction and so that the temperature reaches 140° C. inside the round-bottomed flask. The toluene is emptied from the Dean Stark separator and the temperature of the oil bath is increased to 159° C. and then maintained at this value overnight.

After approximately 20 h, the round-bottomed flask is removed from the oil bath and allowed to cool down to approximately 130° C. inside the round-bottomed reaction flask. 8 mg of 4-fluorobenzophenone are then dissolved in 5 ml of anhydrous N,N-dimethylacetamide and the solution is added to the reaction using a syringe. The round-bottomed flask is placed back in the oil bath and the reaction continues at approximately 145° C. (approximately 158° C. in the oil bath) for an additional 4 h. The reaction mixture is allowed to cool to ambient temperature; the product obtained is subsequently poured into 200 ml of isopropanol. The fibrous precipitate is recovered by filtration.

The polymer is then dried under vacuum at 80° C. overnight. The sodium carbonate is extracted from the polymer by immersing the latter in 50 ml of distilled water with stirring with a magnetic bar for 30 min. The pH of the solution is adjusted down to 7 by dropwise addition of 10% HCl (aq.). The polymer is subsequently dried at 80° C. under vacuum (approximately 12 hours).

The formula of the Polymer 7 thus obtained, in the sulphonated and benzophenone-blocked form, is represented in FIG. 25, along with its $^1$H NMR spectrum (500 MHz), dissolved in $d_6$-DMSO.

V-6. Synthesis of the Polymer 8

Figure 17:
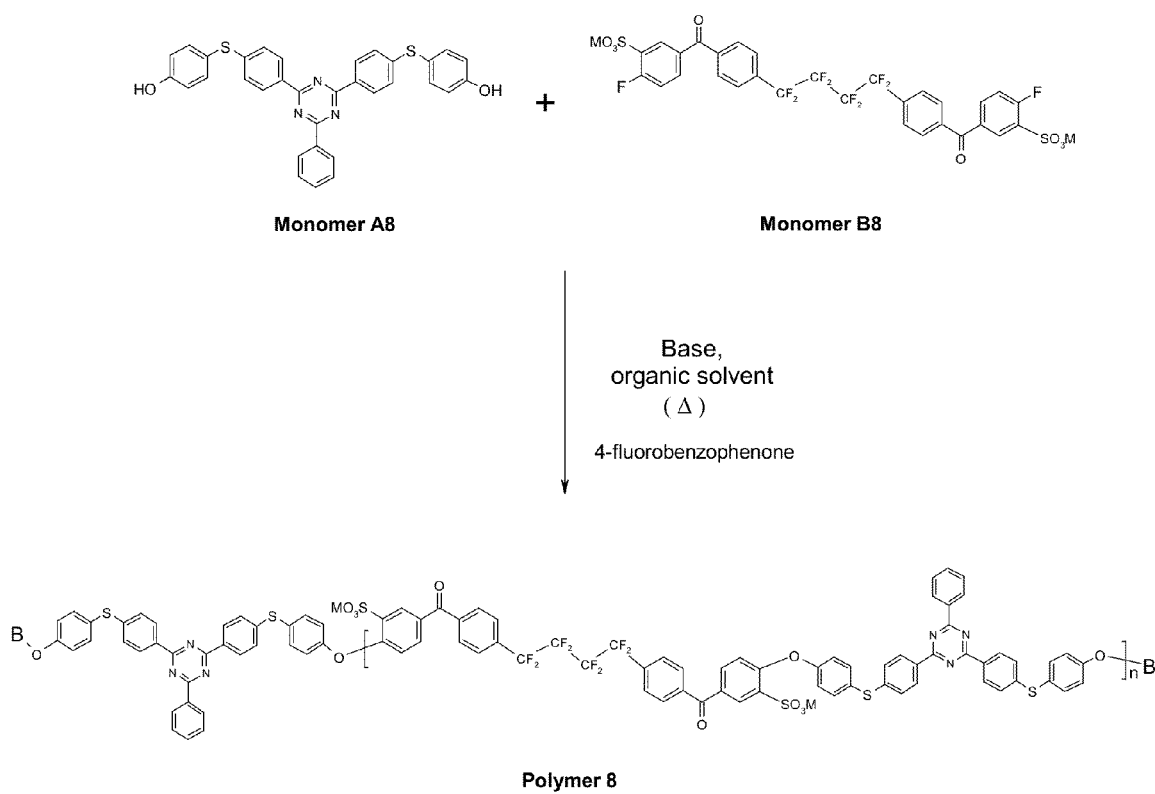

This example describes in a detailed way the synthesis of the Polymer 8, according to a process already commented on in FIG. 17, from the monomer A8 (or Compound 2) and the monomer B8 (or Compound 9) described above, this Polymer 8 being obtained here, on the one hand, in the sulphonated form and, on the other hand, in the form blocked by benzophenone groups.

The monomer B8 and $Na_2CO_3$ are first of all dried separately at 150° C. overnight (under vacuum) and then they are mixed together at 160° C. for 1 h. The monomer A8 is itself also dried at 80° C. (under vacuum) overnight.

The polymerization is carried out in a 100 ml three-necked round-bottomed flask. The round-bottomed flask is surmounted by a nitrogen inlet, a thermometer, a stirrer and a Dean Stark separator surmounted by a reflux condenser. The glass parts of the apparatus (including the reflux condenser and the Dean Stark separator) are dried under vacuum using a hot-air gun. The round-bottomed flask is charged with the monomer A8 (0.848 g, i.e., 1.52 mmol), the monomer B8 (1.22 g, i.e., 1.52 mmol), the anhydrous sodium carbonate (0.48 g, i.e., 4.57 mmol; three times the excess), dry N,N-dimethylacetamide DMA (20 ml) and toluene (4 ml; azeotropic agent). The round-bottomed reaction flask is heated in an oil bath at 100° C. The temperature of the oil bath is subsequently increased to approximately 148° C. and the residual toluene is distilled off (140° C. inside the round-bottomed reaction flask).

The trap of the Dean Stark separator is emptied (toluene drained off) and the temperature of the oil bath is increased to approximately 159° C. (approximately 150° C. inside the round-bottomed flask) and is then maintained at this temperature for approximately 20 hours.

The temperature of the reaction is then lowered to 100° C. inside (the round-bottomed flask is raised above the oil bath) and then 4 mg of 4-fluorobenzophenone dissolved in 5 ml of DMA are injected into the reaction using a syringe. The blocking reaction is subsequently continued in an oil bath regulated at approximately 145° C. (internal temperature) for 4 h. The reaction mixture is allowed to cool to ambient temperature and then the polymer is poured into 300 ml of isopropanol. The fibrous precipitate is recovered by filtration and dried in an oven at 80° C. overnight (under vacuum). The sodium carbonate is removed from the polymer by washing in 30 ml of water and acidified by dropwise addition of 10% HCl down to pH 7. The final polymer thus obtained is dried at 100° C. under vacuum.

The NMR analysis gives the following results:
$^1$H NMR (500 MHz) in $d_6$-DMSO: 7.08-7.09 (d, 2H), 7.17-7.19 (d, 4H), 7.39-7.40 (d, 4H), 7.62-7.64 (m, 6H), 7.80-7.82 (d, 2H), 7.79-7.85 (m, 8H), 8.27-8.28 (s, 2H), 8.65-8.66 (d, 4H), 8.69-8.70 (d, 2H).

V-7. Manufacture of PEM Membranes

In this test, Polymer 1, Polymer 2 and Polymer 8 membranes are prepared according to the "solvent casting" technique as described below.

The polymer (625 mg), dissolved beforehand in 8 ml of N,N-dimethylacetamide, is filtered through a PTFE (polytetrafluoroethylene) microfilter ("Millipore") having a pore size of approximately 0.45 μm. The polymer solution thus filtered is then run into a mould consisting of two superimposed glass sheets, the upper sheet comprising a recess (dimensions 9 cm×9 cm) with a depth equal to 1 mm; the solution is subsequently heated at 50° C. for 24 h and then at 60° C. for 2 h. The traces of organic solvent are then removed from the membrane thus formed by immersing the latter in a bath of distilled water for approximately 12 h.

After final drying at 60° C. under vacuum for 2 h, a strong and transparent membrane, with a thickness which is equal to approximately 50 μm, is thus obtained, which is ready for characterization.

V-8. Characterization of the PEM Membranes

V-8-A) Proton Conductivity

For the acidification of the membrane (to remind, exchange of the $M^+$ cation by $H^+$), the Polymers 1, 2 and 8 are initially immersed in 200 ml of $H_2SO_4$ (aq.), respectively 3.8M (for the Polymer 1) and 1.9M (for the Polymers 2 and 8), for 2 h. Use is made of the acid $H_2SO_4$ distilled twice (Sigma Aldrich), in order to avoid traces of metals. Distilled water is subsequently added in several stages (total duration approximately 12 h) in order to reach a pH equal to 7; the membrane is subsequently thus stored in the distilled water overnight (approximately 12 hours).

The proton conductivity of the membrane, expressed in S/cm (Siemens per centimeter) is determined as indicated below.

Membranes in the form of discs with a diameter of 2 cm (thickness 50 μm) are cut out using a hollow punch. The proton conductivity of the membrane is determined by measuring the real part (Ohmic) and the imaginary part (Capacitance) of the complex impedance, within the range of frequencies lying between 100 kHz and 10 Hz (with amplitude of 100 mV AC). The measurements are carried out with an impedance/AC potentiostat (Zahner, Germany). Nyquist graphs are generated by the measurements of a successive stack of one, two, three and up to six membranes (completely humidified) sandwiched between two platinum electrodes having the same circular shape as the membranes.

For each measurement, the value intercepting the real axis of the Nyquist graph is given, that is to say a value of the imaginary component of the impedance at zero. In general, these points are aligned on an affine straight line, the slope of which directly determines the value of the resistance of the membrane. Its ordinate at the origin determines the contact resistance between the membranes and the platinum electrodes. The latter values and the knowledge of the thickness make it possible to calculate in a known way the resistivity of the membrane; the inverse of this value is the conductivity.

Thus tested, the membranes resulting from the Polymer 1, Polymer 2 and Polymer 8 have shown noteworthy proton conductivity values respectively equal to 89 mS/cm, 73 mS/cm and 35 mS/cm at 25° C. (100% humidity), of the same order of magnitude as, indeed even better than, the conductivity value (approximately 70 mS/cm) measured on the commercial membrane (Nafion® 112") with the same thickness and rigorously tested under the same conditions.

V-8-B) Water Absorption Capacity and Dimensional Stability

Once the membrane has been acidified, it is dried at 100° C. under vacuum for 2 hours. Its weight is immediately measured, before it captures atmospheric moisture. The membrane samples are then immersed in distilled water at ambient temperature until saturated (no additional weight gain due to water is observed).

The water absorption capacity, expressed in %, is calculated as the difference between the weight of the wet membrane and the weight of the dry membrane. The dimensional stability, also expressed in %, is the ratio of the main dimension of the dry membrane to the main dimension of the completely humidified membrane.

It is noted that the membranes of the Polymer 1, Polymer 2 and Polymer 8 have a water absorption capacity respectively equal to 27%, 17% and 20% of their weight, in comparison with a value of approximately 23% for the commercial membrane (Nafion® 112"). Their dimensional stability is respectively equal to 20%, 5% and 1%, in comparison with a value of 7% for the control commercial membrane.

In other words, it is found that the membranes in accordance with the invention unexpectedly exhibit not only a reduced water absorption capacity but also a noteworthy dimensional stability, so many factors which are determining for the endurance and the chemical stability of the membrane while operating in a PEM fuel cell.

V-8-C) Surface Morphology

Horizontal and transverse membrane cross sections are produced (each sample with a thickness of approximately 70 nm) and are then coated in a liquid epoxy resin. The resin is then polymerized at 60° C. for 48 h in the presence of a curing agent and an accelerator.

After impregnating the membrane samples in an aqueous solution of uranyl acetate ($UO^{2+}(CH_3COO^-)_2$) and then of lead citrate, the morphology of the membrane is observed using a transmission electron microscope (Philips TEM CM100; magnification 245 000).

The electron microscopy photographs, respectively recorded on a horizontal cross section (FIG. 28A) and on a transverse cross section (FIG. 28B) of a membrane in accordance with the invention (Polymer 1), are reproduced in FIG. 26.

A mean pore size equal to 2.4 nm with a standard deviation of 0.5 nm constitutes a particularly noteworthy and unexpected result for a person skilled in the art. In comparison with the known commercial membranes, the invention thus makes it possible to obtain a greatly improved surface morphology with, on the one hand, very substantially reduced pore sizes and, on the other hand, a particularly narrow distribution in the sizes; such characteristics are determining for the overall electrical performance of the membrane, for its properties of impermeability to gases and for its final endurance.

V-8-D) Performance in a PEM Fuel Cell

The performances of the membranes are tested on a test bed for fuel cells on which the temperature, the pressure, the flow rate and the humidity of the gases can be regulated. The gases used are pure hydrogen and pure oxygen, at a temperature of 65° C.

The fuel cell used in these tests is composed of a single cell comprising the polymer membrane to be tested, positioned between two "GDE" (Gas-Diffusion Electrode) layers, two graphite bipolar plates and two standard electrodes ("ELE 0107" from Johnson Matthey) having a platinum content of approximately 0.4 mg/cm$^2$.

The membrane to be tested is first of all dried between two nonwovens (sterile chamber grade, "Sontara Micropure 100"—supplier DuPont). It is subsequently pressed between two glass plates at 60° C. for 3 h. The MEA assembly is obtained by hot pressing a Pt/C catalysis layer positioned on each side of the membrane (115° C., 125 MPa). At this stage, the MEA assembly can be assembled between two bipolar plates to form a single cell of a fuel cell which is ready to operate when it is fed with hydrogen and oxygen.

For the requirements of the test, the fuel cell is subjected to stationary conditions (0.7 V) or to shutdown and startup or "OCV" (Open Circuit Voltage) situations, in order, in a known way, to subject the membrane to the most aggressive operating conditions (e.g., peroxides, free radicals, and the like) and to finally deduce therefrom its overall chemical resistance.

Figure 27:
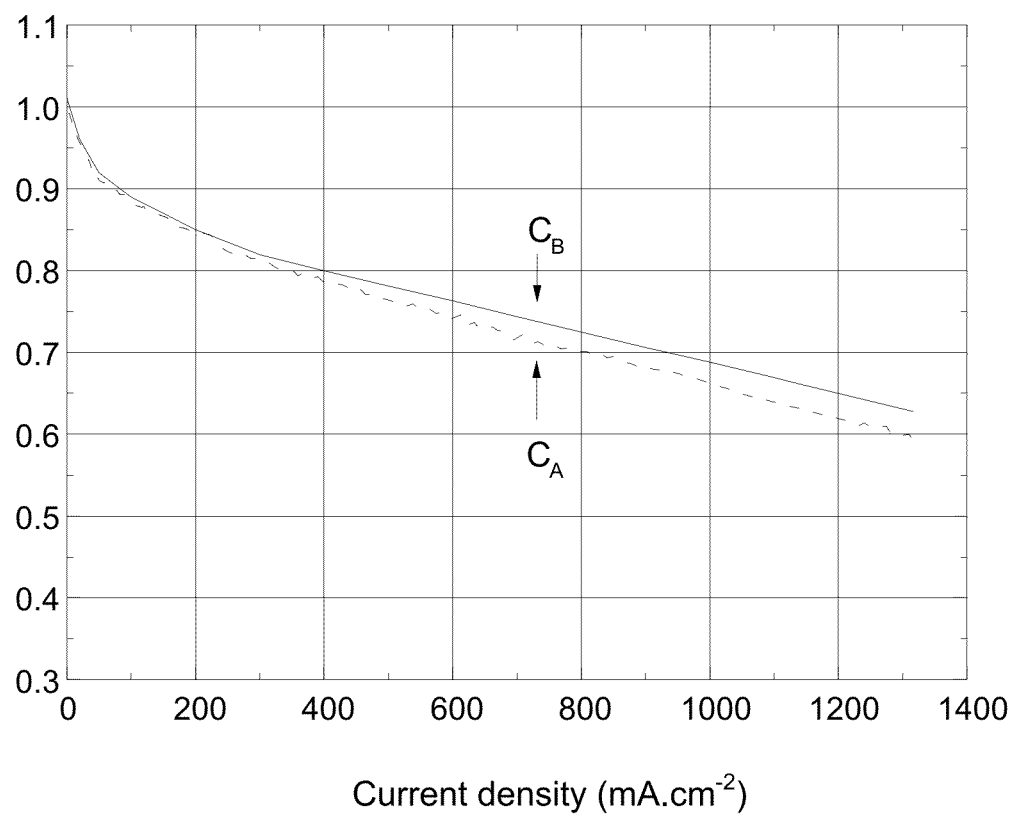

FIG. 27 reproduces the "polarization" curve, the voltage of the single cell being recorded as a function of the current density delivered by the fuel cell, on the one hand for the membrane consisting of the Polymer 1 (curve $C_A$) and, on the other hand, for the commercial membrane ("Nafion® 112" polymer, curve $C_B$).

The following comments result from the reading of these two curves:

first of all, at high voltage and zero current (open electrical circuit), it is noted that the polarization voltage is equivalent for the two membranes, which illustrates, to a person skilled in the art, an equivalent permeability to the gases ($O_2$ and $H_2$);

subsequently, a substantially identical slope of the two curves is observed in their central linear part (typically between 200 and 1200 mA/cm$^2$), which testifies to an identical electrical performance of the two membranes, without even a particular optimization of the electrodes (anode and cathode) for the specific membrane of the invention;

finally, at high current and low voltage (typically above 1200 mA/cm$^2$), it is observed that the behaviour of the two membranes remains similar, which confirms a very good proton conductivity of the membrane at high current.

Figure 28:
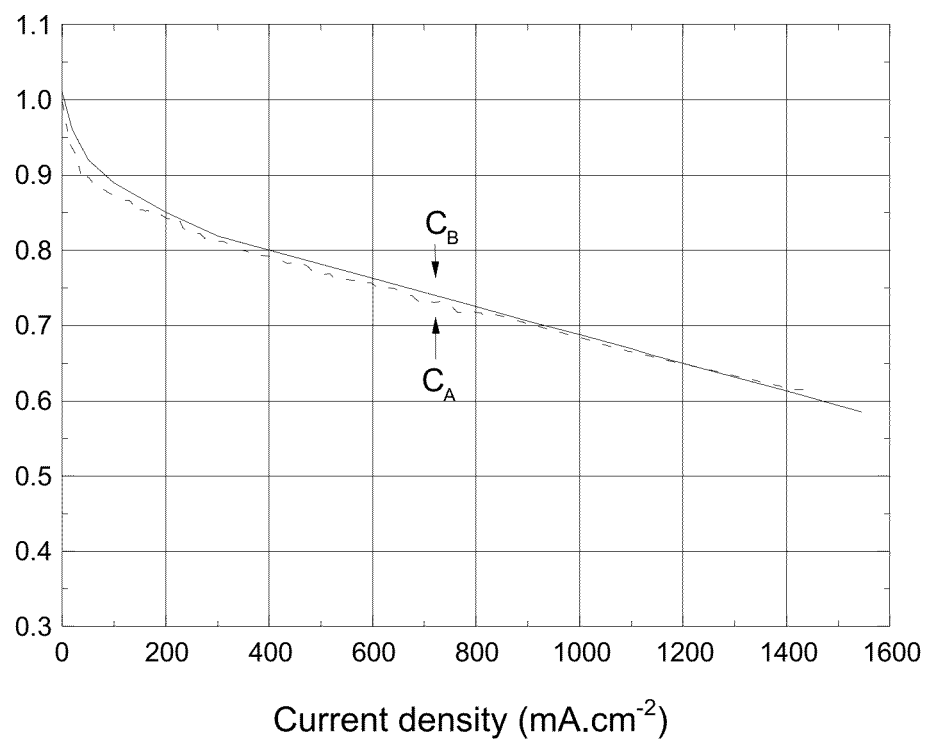

FIG. 28 reproduces the results recorded on a membrane (curve $C_A$) consisting of the Polymer 1 this time reinforced with a layer (thickness 10 μm) of ePTFE (porosity 80%, supplier Donaldson) to form a composite membrane in accordance with the invention, in comparison with the same commercial membrane (not reinforced) as above (curve $C_B$). On studying the two curves of this FIG. 28, the same excellent results are observed with regard to the reinforced polymer of the invention.

In conclusion, the invention makes it possible to manufacture PEM membranes which, unexpectedly, exhibit a chemical and dimensional stability and an ion conductivity which are at least equivalent, if not superior, to those of the commercial membranes of the Nafion® type which have, however, been developed for a very long time.

The polymer of the invention results from relatively inexpensive monomers and it is capable of being prepared according to simple, economical and environmentally friendly processes of synthesis. Finally, it has a noteworthy chemical stability and a noteworthy resistance to oxidation in comparison with the triazine polymers of the prior art.

The invention claimed is:

1. A triazine polymer usable in a fuel cell, the triazine polymer comprising a plurality of base structural units that include at least a moiety corresponding to a formula (I):

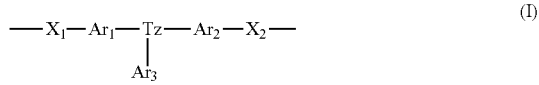

in which:
$X_1$ and $X_2$, which are identical or different, represent S, SO, or $SO_2$;
$Ar_1$ and $Ar_2$, which are identical or different, represent a substituted or unsubstituted phenylene group;
$Ar_3$ represents a substituted or unsubstituted phenyl group; and
Tz represents a 1,3,5-triazine nucleus.

2. The triazine polymer according to claim 1, wherein the moiety of the base structural units corresponds to a formula (I-A):

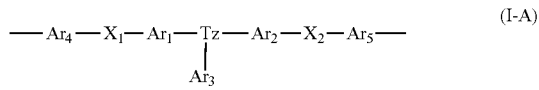

in which $Ar_4$ and $Ar_5$, which are identical or different, represent a substituted or unsubstituted phenylene group.

3. The triazine polymer according to claim 1, wherein the moiety of the base structural units corresponds to a formula (I-B):

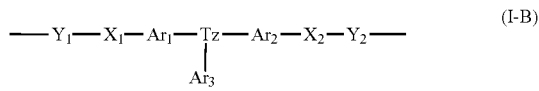

in which $Y_1$ and $Y_2$, which are identical or different, represent a perfluorinated hydrocarbon linkage.

4. The triazine polymer according to claim 3, wherein the perfluorinated hydrocarbon linkage is a perfluoroalkylene of a formula $(CF_2)_m$, in which m varies from 1 to 20.

5. The triazine polymer according to claim 3, wherein the perfluorinated hydrocarbon linkage is a perfluorocyclobutylene.

6. The triazine polymer according to claim 1, further comprising additional structural units of a formula (II-A), (II-B), or (II-C):

  (II-A)

  (II-B)

  (II-C)

in which:
$Ar_6$, $Ar_7$, $Ar_8$, $Ar_9$, $Ar_{10}$, $Ar_{11}$, $Ar_{12}$ and $Ar_{13}$, which are identical or different, represent a substituted or unsubstituted phenylene group;
$X_3$, $X_4$ and $X_5$, which are identical or different, represent S, SO, or $SO_2$; and
m varies from 1 to 20.

7. The triazine polymer according to claim 1, wherein at least a portion of the base structural units are connected to one another via bridges chosen from a group that includes: ether (—O—) bonds, thioether (—S—) bonds, sulphoxide (—SO—) bonds, sulphone (—$SO_2$—) bonds, and mixtures thereof.

8. The triazine polymer according to claim 7, wherein at least a portion of the additional structural units are connected to one another via bridges chosen from a group that includes: ether (—O—) bonds, thioether (—S—) bonds, sulphoxide (—SO—) bonds, sulphone (—$SO_2$—) bonds, and mixtures thereof.

9. The triazine polymer according to claim 1, further comprising chain ends that are blocked.

10. The triazine polymer according to claim 9, wherein the chain ends are blocked by aromatic blocking groups.

11. The triazine polymer according to claim 10, wherein the aromatic blocking groups are chosen from a group that includes: substituted phenyls, substituted benzophenones, substituted diphenyl sulphones, substituted phenyl perfluoroalkyl sulphones, and mixtures thereof.

12. The triazine polymer according to claim 11, wherein the aromatic blocking groups are monosubstituted.

13. The triazine polymer according to claim 6, wherein $X_1$, $X_2$, $X_3$, $X_4$ and $X_5$ all represent $SO_2$.

14. The triazine polymer according to claim 1, further comprising at least one sulphonic or sulphonate group.

15. The triazine polymer according to claim 14, wherein the at least one sulphonic or sulphonate group is carried by at least one phenyl or phenylene group, or by at least one substituent thereof, in at least one of the base structural units.

16. The triazine polymer according to claim 14, wherein the at least one sulphonic or sulphonate group is carried by at least one phenyl or phenylene group, or by at least one substituent thereof, in at least one of the additional structural units.

17. The triazine polymer according to claim 14,
wherein the moiety of the base structural units corresponds to a formula (I-B):

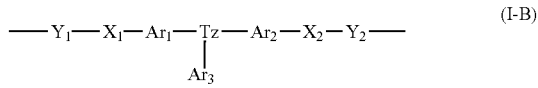

in which $Y_1$ and $Y_2$, which are identical or different, represent a perfluorinated hydrocarbon linkage, and
wherein the at least one sulphonic or sulphonate group is carried by at least one perfluorinated hydrocarbon linkage, or by at least one substituent thereof, in at least one of the base structural units.

18. The triazine polymer according to claim 14,
wherein the moiety of the base structural units corresponds to a formula (I-B):

$$—Y_1—X_1—Ar_1—\underset{\underset{Ar_3}{|}}{Tz}—Ar_2—X_2—Y_2— \quad (I\text{-}B)$$

in which $Y_1$ and $Y_2$, which are identical or different, represent a perfluorinated hydrocarbon linkage, and wherein the at least one sulphonic or sulphonate group is carried by at least one perfluorinated hydrocarbon linkage, or by at least one substituent thereof, in at least one of the additional structural units.

19. A method of operating a fuel cell, comprising using a triazine polymer as a membrane in the fuel cell, wherein the triazine polymer includes a plurality of base structural units, and wherein the base structural units include at least a moiety corresponding to a formula (I):

$$—X_1—Ar_1—\underset{\underset{Ar_3}{|}}{Tz}—Ar_2—X_2— \quad (I)$$

in which:

$X_1$ and $X_2$, which are identical or different, represent S, SO, or $SO_2$;

$Ar_1$ and $Ar_2$, which are identical or different, represent a substituted or unsubstituted phenylene group;

$Ar_3$ represents a substituted or unsubstituted phenyl group; and

Tz represents a 1,3,5-triazine nucleus.

20. A fuel-cell membrane comprising a triazine polymer, wherein the triazine polymer includes a plurality of base structural units, and wherein the base structural units include at least a moiety corresponding to a formula (I):

$$—X_1—Ar_1—\underset{\underset{Ar_3}{|}}{Tz}—Ar_2—X_2— \quad (I)$$

in which:

$X_1$ and $X_2$, which are identical or different, represent S, SO, or $SO_2$;

$Ar_1$ and $Ar_2$, which are identical or different, represent a substituted or unsubstituted phenylene group;

$Ar_3$ represents a substituted or unsubstituted phenyl group; and

Tz represents a 1,3,5-triazine nucleus.

21. The fuel-cell membrane according to claim 20, wherein the triazine polymer is reinforced with a layer of expanded microporous polytetrafluoroethylene.

22. A fuel cell comprising a membrane formed of a triazine polymer, wherein the triazine polymer includes a plurality of base structural units, and wherein the base structural units include at least a moiety corresponding to a formula (I):

$$—X_1—Ar_1—\underset{\underset{Ar_3}{|}}{Tz}—Ar_2—X_2— \quad (I)$$

in which:

$X_1$ and $X_2$, which are identical or different, represent S, SO, or $SO_2$;

$Ar_1$ and $Ar_2$, which are identical or different, represent a substituted or unsubstituted phenylene group;

$Ar_3$ represents a substituted or unsubstituted phenyl group; and

Tz represents a 1,3,5-triazine nucleus.

\* \* \* \* \*